US012783491B1

(12) United States Patent
Tuthill et al.

(10) Patent No.: US 12,783,491 B1
(45) Date of Patent: Nov. 3, 2026

(54) INSTRUCTION SET GENERATION USING GRAPH DATA STRUCTURES AND REMOTE AND LOCAL DATA REPOSITORIES

(71) Applicant: THE HUNTINGTON NATIONAL BANK, Columbus, OH (US)

(72) Inventors: Daniel R. Tuthill, Columbus, OH (US); Robert Lumpkin, Columbus, OH (US); Alexandra Bianca Davis, Columbus, OH (US); Samayita Bhattacharjee, Columbus, OH (US); Jason W. Black, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/639,767

(22) Filed: Apr. 6, 2026

(51) Int. Cl.
*G06F 16/00* (2019.01)
*G06F 16/22* (2019.01)
*G06F 16/2455* (2019.01)
*H04L 9/40* (2022.01)

(52) U.S. Cl.
CPC ...... *G06F 16/2272* (2019.01); *G06F 16/2455* (2019.01); *H04L 63/10* (2013.01)

(58) Field of Classification Search
None
See application file for complete search history.

(56) References Cited

U.S. PATENT DOCUMENTS

2018/0260442 A1* 9/2018 Vaidhyanathan ..... G06F 16/285
2019/0050561 A1* 2/2019 Li ......................... G06F 21/552
2026/0099617 A1* 4/2026 Berger ................ G06F 16/2455

* cited by examiner

*Primary Examiner* — Anhtai V Tran
(74) *Attorney, Agent, or Firm* — Kilpatrick Townsend & Stockton LLP

(57) ABSTRACT

Techniques are disclosed for generating instruction sets and initializing executable system resources using dynamic graph data structures. A system detects a system-generated event signal based on a machine-readable data stream associated with a user data structure, where the data stream integrates first metadata from internal logged interactions and second metadata from external system events stored on remote repositories. The system constructs a computer-generated graph data structure with vertices representing entries from both metadata sources, and establishes linkages reflecting their relationships. A model queries the graph data structure, analyzing event signals, vertices, and linkages to produce an enhanced feature set. An instruction set, including structured data fields initialized with the enhanced feature set, is generated and associated with the user data structure. Upon receiving input related to the instruction set, the system initiates an executable system resource to perform automated, context-driven actions.

20 Claims, 6 Drawing Sheets

600

INSTRUCTION SET GENERATION USING GRAPH DATA STRUCTURES AND REMOTE AND LOCAL DATA REPOSITORIES

BACKGROUND

Data integration and automation technologies are utilized to support the collection, processing, and organization of information originating from multiple sources. These systems employ computational models to represent relationships among various data entities and to enable operations. Platforms often incorporate mechanisms for managing data streams, facilitating the analysis of information for use in computational workflows.

BRIEF SUMMARY

Techniques are provided for generating an instruction set and initializing an executable system resource. Various embodiments are described herein, including methods, systems, non-transitory computer-readable storage media storing programs, code, or instructions executable by one or more processors, and the like.

According to various embodiments, a computer-implemented method may include detecting a system-generated event signal based at least in part on a machine-readable data stream that is associated with a user data structure, the machine-readable data stream being generated based at least in part on first metadata associated with logged interactions of the user data structure, the first metadata being stored on a local data repository, and second metadata associated with an external system event that is stored on a remote data repository, the second metadata being generated independently of the logged interactions or the user data structure. The method may further include generating a computer-generated graph data structure by generating a first group of graph vertices that represent data entries in the first metadata, generating a second group of graph vertices that represent data entries in the second metadata, and generating one or more graph data structure linkages that connect one or more first graph vertices of the first group of graph vertices to one or more second graph vertices of the second group of graph vertices based at least in part on data relationships between the first group of graph vertices and the second group of graph vertices. The method may also include causing a model to generate an output by querying the computer-generated graph data structure based at least in part on at least one of the system-generated event signal, the one or more first graph vertices, the one or more second graph vertices, the one or more graph data structure linkages, or the data relationships, the output including an enhanced feature set of at least one of the first metadata or the second metadata. The method may include generating an instruction set that is associated with the user data structure based at least in part on the output, the instruction set including one or more structured data fields that are initialized with the enhanced feature set. The method may include causing an executable system resource associated with the user data structure to be initiated based at least in part on receiving an input associated with the instruction set.

According to various embodiments, the computer-implemented method may further include the machine-readable data stream being further generated based at least in part on causing, by a secure environment that includes the local data repository, a fenced ingestion gateway to initiate, causing the fenced ingestion gateway to retrieve the external system event from the remote data repository, performing a validation check on unverified data associated with the external system event based at least in part on a security protocol, and causing the fenced ingestion gateway to perform at least one of converting the unverified data into the second metadata based at least in part on the unverified data passing the validation check and transmitting, in a secure payload, the second metadata to the secure environment, or quarantining the unverified data based at least in part on the unverified data failing the validation check.

According to various embodiments, the computer-implemented method may further include the model being a machine learning model, and may further include generating a trained machine learning model based at least in part on training the machine learning model by using at least one of the computer-generated graph data structure or the second metadata as unlabeled training data, and the first metadata as labeled data. The method may further include deploying the trained machine learning model to be used by a digital assistant.

According to various embodiments, the computer-implemented method may further include causing a digital assistant to access the instruction set and generating a graphical user interface by the digital assistant based at least in part on the instruction set, generating and displaying on the graphical user interface, for at least the one or more structured data fields, an interactive object that includes a representation associated with the enhanced feature set, the input being associated with an interaction with the interactive object.

According to various embodiments, the computer-implemented method may further include retrieving an existing computer-generated graph data structure that was generated using at least the first metadata, the first group of graph vertices existing within the existing computer-generated graph data structure, and generating the computer-generated graph data structure further including adding the second group of graph vertices to the existing computer-generated graph data structure.

According to various embodiments, the computer-implemented method may further include generating an updated computer-generated graph data structure based at least in part on at least one of the instruction set and feedback data, the feedback data representing an instruction to modify the instruction set to modify a first structured data field of the one or more structured data fields.

According to various embodiments, the computer-implemented method may further include initializing the executable system resource by causing at least one of isolating a network data instantiation associated with the user data structure, blocking the network data instantiation associated with the user data structure, and permitting the network data instantiation to occur that is associated with the user data structure.

According to various embodiments, a non-transitory computer readable medium may include instructions that when executed by one or more processors, cause the one or more processors to perform operations including detecting a system-generated event signal based at least in part on a machine-readable data stream that is associated with a user data structure, the machine-readable data stream being generated based at least in part on first metadata associated with logged interactions of the user data structure, the first metadata being stored on a local data repository, and second metadata associated with an external system event that is stored on a remote data repository, the second metadata being generated independently of the logged interactions or the user data structure. The operations may further include generating a computer-generated graph data structure by generating a first group of graph vertices that represent data entries in the first metadata, generating a second group of graph vertices that represent data entries in the second metadata, and generating one or more graph data structure linkages that connect one or more first graph vertices of the first group of graph vertices to one or more second graph vertices of the second group of graph vertices based at least in part on data relationships between the first group of graph vertices and the second group of graph vertices. The operations may also include causing a model to generate an output by querying the computer-generated graph data structure based at least in part on at least one of the system-generated event signal, the one or more first graph vertices, the one or more second graph vertices, the one or more graph data structure linkages, or the data relationships, the output including an enhanced feature set of at least one of the first metadata or the second metadata. The operations may include generating an instruction set that is associated with the user data structure based at least in part on the output, the instruction set including one or more structured data fields that are initialized with the enhanced feature set. The operations may include causing an executable system resource associated with the user data structure to be initiated based at least in part on receiving an input associated with the instruction set.

According to various embodiments, the non-transitory computer readable medium may further include the machine-readable data stream being further generated based at least in part on causing, by a secure environment that includes the local data repository, a fenced ingestion gateway to initiate, causing the fenced ingestion gateway to retrieve the external system event from the remote data repository, performing a validation check on unverified data associated with the external system event based at least in part on a security protocol, and causing the fenced ingestion gateway to perform at least one of converting the unverified data into the second metadata based at least in part on the unverified data passing the validation check and transmitting, in a secure payload, the second metadata to the secure environment, or quarantining the unverified data based at least in part on the unverified data failing the validation check.

According to various embodiments, the non-transitory computer readable medium may further include the model being a machine learning model, and the operations further including generating a trained machine learning model based at least in part on training the machine learning model by using at least one of the computer-generated graph data structure or the second metadata as unlabeled training data, and the first metadata as labeled data, and deploying the trained machine learning model to be used by a digital assistant.

According to various embodiments, the non-transitory computer readable medium may further include causing a digital assistant to access the instruction set and generating a graphical user interface by the digital assistant based at least in part on the instruction set, generating and displaying on the graphical user interface, for at least the one or more structured data fields, an interactive object that includes a representation associated with the enhanced feature set, the input being associated with an interaction with the interactive object.

According to various embodiments, the non-transitory computer readable medium may further include retrieving an existing computer-generated graph data structure that was generated using at least the first metadata, the first group of graph vertices existing within the existing computer-generated graph data structure, and generating the computer-generated graph data structure further including adding the second group of graph vertices to the existing computer-generated graph data structure.

According to various embodiments, the non-transitory computer readable medium may further include generating an updated computer-generated graph data structure based at least in part on at least one of the instruction set and feedback data, the feedback data representing an instruction to modify the instruction set to modify a first structured data field of the one or more structured data fields.

According to various embodiments, the non-transitory computer readable medium may further include initializing the executable system resource by causing at least one of isolating a network data instantiation associated with the user data structure, blocking the network data instantiation associated with the user data structure, and permitting the network data instantiation to occur that is associated with the user data structure.

According to various embodiments, a system may include one or more processors and one or more memories having instructions that when executed by the one or more processors, cause the one or more processors to perform operations including detecting a system-generated event signal based at least in part on a machine-readable data stream that is associated with a user data structure, the machine-readable data stream being generated based at least in part on first metadata associated with logged interactions of the user data structure, the first metadata being stored on a local data repository, and second metadata associated with an external system event that is stored on a remote data repository, the second metadata being generated independently of the logged interactions or the user data structure. The operations may further include generating a computer-generated graph data structure by generating a first group of graph vertices that represent data entries in the first metadata, generating a second group of graph vertices that represent data entries in the second metadata, and generating one or more graph data structure linkages that connect one or more first graph vertices of the first group of graph vertices to one or more second graph vertices of the second group of graph vertices based at least in part on data relationships between the first group of graph vertices and the second group of graph vertices. The operations may also include causing a model to generate an output by querying the computer-generated graph data structure based at least in part on at least one of the system-generated event signal, the one or more first graph vertices, the one or more second graph vertices, the one or more graph data structure linkages, or the data relationships, the output including an enhanced feature set of at least one of the first metadata or the second metadata. The operations may include generating an instruction set that is associated with the user data structure based at least in part on the output, the instruction set including one or more structured data fields that are initialized with the enhanced feature set. The operations may include causing an executable system resource associated with the user data structure to be initiated based at least in part on receiving an input associated with the instruction set.

According to various embodiments, the system may further include the machine-readable data stream being further generated based at least in part on causing, by a secure environment that includes the local data repository, a fenced ingestion gateway to initiate, causing the fenced ingestion gateway to retrieve the external system event from the remote data repository, performing a validation check on unverified data associated with the external system event based at least in part on a security protocol, and causing the fenced ingestion gateway to perform at least one of converting the unverified data into the second metadata based at least in part on the unverified data passing the validation check and transmitting, in a secure payload, the second metadata to the secure environment, or quarantining the unverified data based at least in part on the unverified data failing the validation check.

According to various embodiments, the system may further include the model being a machine learning model, the operations further including generating a trained machine learning model based at least in part on training the machine learning model by using at least one of the computer-generated graph data structure or the second metadata as unlabeled training data, and the first metadata as labeled data, and deploying the trained machine learning model to be used by a digital assistant.

According to various embodiments, the system may further include causing a digital assistant to access the instruction set and generating a graphical user interface by the digital assistant based at least in part on the instruction set, generating and displaying on the graphical user interface, for at least the one or more structured data fields, an interactive object that includes a representation associated with the enhanced feature set, the input being associated with an interaction with the interactive object.

According to various embodiments, the system may further include retrieving an existing computer-generated graph data structure that was generated using at least the first metadata, the first group of graph vertices existing within the existing computer-generated graph data structure, and generating the computer-generated graph data structure further including adding the second group of graph vertices to the existing computer-generated graph data structure.

According to various embodiments, the system may further include initializing the executable system resource by causing at least one of isolating a network data instantiation associated with the user data structure, blocking the network data instantiation associated with the user data structure, and permitting the network data instantiation to occur that is associated with the user data structure.

At least one embodiment is directed to a computing device comprising one or more processors and one or more memories storing computer-executable instructions that, when executed by the one or more processors, cause the one or more processors to perform the method(s) disclosed herein.

At least one embodiment is directed to a non-transitory computer-readable storage medium storing computer-executable instructions that, when executed with one or more processors of a computing device, causes the one or more processors to perform the method(s) disclosed herein.

BRIEF DESCRIPTION OF THE DRAWINGS

Various embodiments in accordance with the present disclosure will be described with reference to the drawings, in which.

Figure 1:
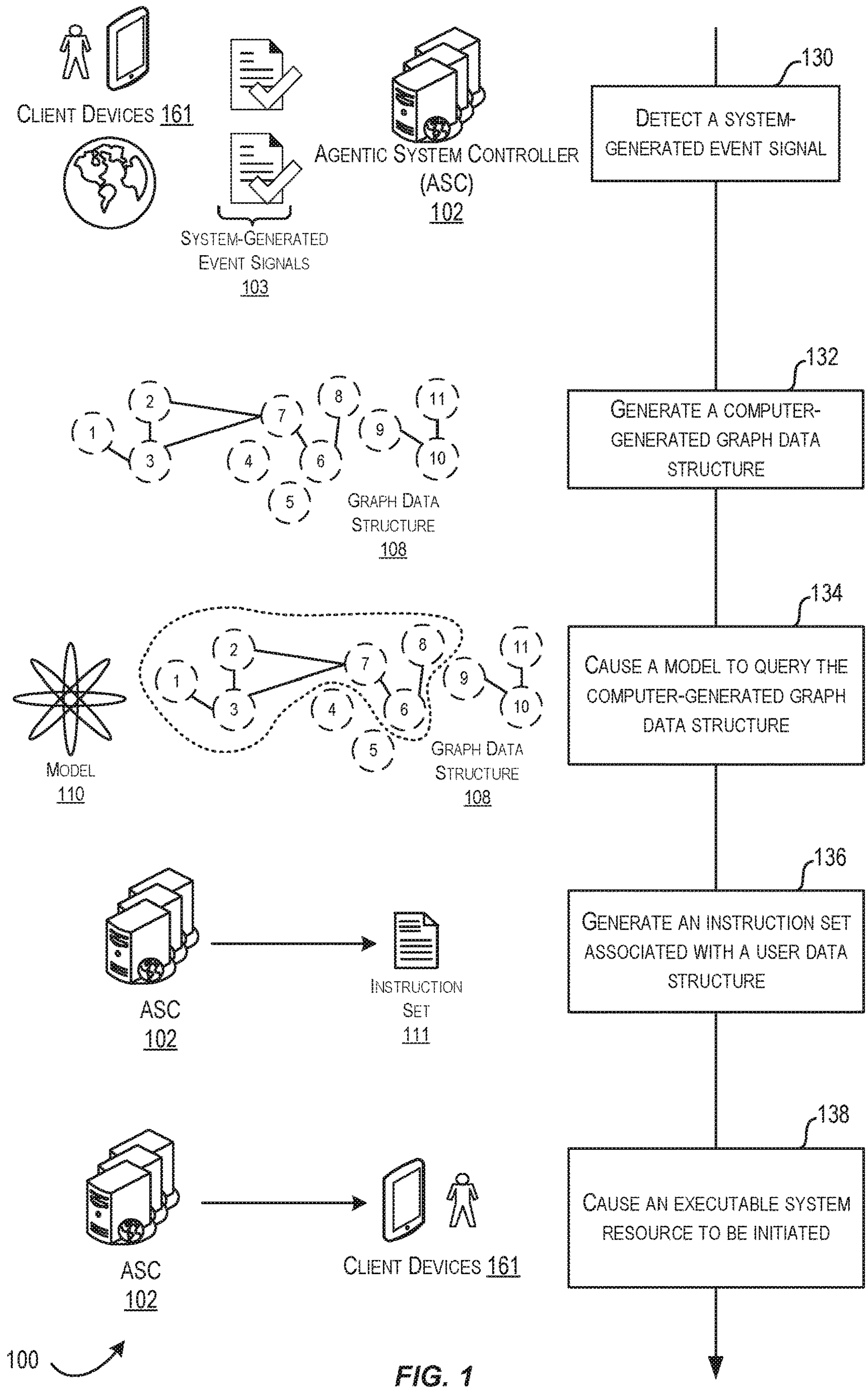
FIG. 1 is a simplified diagram of an example method for generating an instruction set and initializing an executable system resource, according to various embodiments.

The foregoing aspects and many of the advantages of the present disclosure will become more readily appreciated as these advantages become better understood by reference to the following detailed description, when taken in conjunction with the accompanying drawings.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions, and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

I. Introduction

According to embodiments herein, a system may help a person understand information about a particular object or device by gathering data from different sources and organizing the data. The system may collect information from system records and also from outside sources, then connect these pieces of information to show how the pieces relate. A data stream may include, without limitation, a flow of information from sensors, logs, alerts, or other suitable equivalent. The system may analyze the connections among the pieces of information to suggest actions or highlight various activities and perform actions based on those activities. The system may display a graphical user interface with interactive elements, e.g., buttons, that let a user choose appropriate actions. For example, when a user interacts with an interactive element, the system may start a process that, for example, isolates a network data instantiation, blocks a network data instantiation, or permits network data instantiation to proceed, or other suitable equivalent.

Conventional devices often rely on manual linking of internal and external information using fixed rules or static templates. Processing in these systems may occur within isolated silos, using explicit human input or repetitive configuration to correlate internal data with external signals. Relationships between multiple sources of data may not be modeled dynamically, limiting an ability to adapt to changes or emerging patterns in real time. Validation, merging, and interpretation of data streams may depend on human intervention, which can introduce delays, inconsistencies, and increased error rates. Integration of unverified external data may expose internal systems to risk, as conventional devices frequently lack mechanisms for isolating sensitive internal information from external sources. Automated initiation of system resources based on complex event analysis is commonly absent, resulting in missed opportunities for timely response or mitigation. Adaptive workflows triggered by multi-source events are rarely supported, restricting the generation of instruction sets that drive downstream actions based on evolving conditions. Fencing security components, e.g., gateways that validate and sanitize incoming external data before it interacts with internal systems, are generally not included, leaving conventional devices vulnerable to malicious or malformed content and limiting their effectiveness in environments requiring stringent data isolation and protection.

According to embodiments of the present disclosure, a computer-implemented method may detect a system-generated event signal based at least in part on a machine-readable data stream associated with a user data structure. A machine-readable data stream may be electronically encoded information that combines records from internal and external sources. A user data structure may be a digital representation of an entity or object within the computer system. The machine-readable data stream may be generated using first metadata that describes logged interactions of the user data structure and second metadata that describes an external system event. First metadata may be information that records how the user data structure interacts with the system. Second metadata may be information about an event or occurrence outside the internal environment, collected independently from the activity of the user data structure.

In various embodiments, the computer system may generate a computer-generated graph data structure, which may be a digital network of points and connections that represent relationships among pieces of information. A first group of graph vertices may represent data entries from the first metadata, and a second group of graph vertices may represent data entries from the second metadata. Graph data structure linkages may connect one or more first graph vertices to one or more second graph vertices, showing how the information relates. The system may use a model to query some or all of the computer-generated graph data structure and generate an output. A model may be a computational process that analyzes data and produces results. The output may be an enhanced feature set that includes processed or combined attributes from the first metadata or the second metadata. The system may generate an instruction set associated with the user data structure based on the output, and the instruction set may contain structured data fields filled with the enhanced feature set. When the system receives input associated with the instruction set, the system may cause an executable system resource to initiate. An executable system resource may be a process or function that performs a computer driven action based at least in part on the instruction set.

In a non-limiting illustrative example, the system may monitor laboratory equipment and environmental conditions within a secure network. For example, the system may detect a system-generated event signal when a sensor reports a change in temperature. The machine-readable data stream may include first metadata that describes logged interactions, e.g., equipment setting adjustments and user access events, collected from within the secure network. Second metadata may describe an external system event, for example, a weather alert received from a public data feed located in an unsecure network. To access this remote data, the system may use a fenced ingestion gateway, which separates and protects the secure network from the unsecure network. The fenced ingestion gateway may retrieve the external system event, validate and sanitize the received data, and ensure that only safe information is permitted into the secure environment. The system may generate a graph data structure that connects information about equipment usage to information about environmental alerts, showing how changes in one may relate to changes in the other. The system may use a model to analyze the graph data structure and produce an output that identifies potential risk factors, e.g., the possibility that external weather conditions are affecting laboratory performance. The system may create an instruction set with structured fields, e.g., recommended actions or risk levels, based on the analysis. When a technician acknowledges the instruction set, the computer system may initiate an executable system resource, e.g., adjusting equipment settings or sending a notification to facility staff, while maintaining data control and integrity through the fencing and validation mechanisms.

The system may address the limitations of manual linking of internal and external information by automating the correlation process using dynamic graph data structures, which model relationships between multiple sources in real time. Unlike conventional devices that operate in isolated silos and rely on explicit human input or repetitive configuration, the system may integrate and relate internal records with external signals, reducing manual intervention. By modeling relationships dynamically, the system may adapt to changes and emerging patterns promptly, rather than relying on static templates or fixed rules. Validation, merging, and interpretation of data streams may be performed automatically in real-time, minimizing delays, inconsistencies, and error rates that occur when human intervention is used.

The integration of external data is protected by a fenced ingestion gateway, which validates and sanitizes incoming information before permitting access to the secure environment to isolate sensitive internal information from potential threats and reducing exposure to risk. Initiation of system resources based on complex event analysis may allow the computer system to respond to events rapidly, supporting timely mitigation or operational adjustments that conventional devices might miss. Embodiments herein may support adaptive workflows triggered by multi-source events so the generation of instruction sets and downstream actions that reflect evolving conditions. By incorporating fencing security components e.g., gateways that validate and sanitize external data, the system may provide enhanced protection against malicious or malformed content, ensuring data isolation and integrity in environments where stringent safeguards are desired.

The system may further improve data integration by supporting automated workflows that are initiated based on the analysis of both internal and external data. When a system-generated event signal is detected, the system may generate instruction sets and trigger executable resources without repetitive manual configuration or human approval for each new correlation. This automation may reduce delays and inconsistencies that arise from human-dependent processes, allowing the system to produce consistent and timely responses to complex events. As a result, opportunities for rapid mitigation or adjustment are increased, and the likelihood of missed responses due to manual bottlenecks is reduced.

The system may also enhance operational safety and reliability by employing fencing security mechanisms that validate and sanitize external data before it is processed within the secure environment. Unlike conventional devices that may lack isolation between sensitive internal information and unverified external sources, the system uses a fenced ingestion gateway to restrict entry of potentially harmful content. The fenced ingestion gateway may enforce security protocols and data validation checks, which help to prevent malicious or malformed data from affecting internal operations.

The system may improve the efficiency and reliability of data integration by constructing computer-generated graph data structures that reflect both internal and external sources within a unified architecture. Unlike conventional devices that depend on manual entry or rigid mapping, the system may automatically update the graph structure in response to changes in the underlying data. This may allow the computer system to encode relationships between entities, support querying operations, and manage large or heterogeneous data sets without incurring delays from user-driven updates. By relying on graph-based modeling, the system may reveal indirect connections and dependencies that would otherwise be missed, enabling faster and more thorough analysis. This technical solution may reduce both the computational workload and the risk of errors that arise in manual or template-driven systems so that the platform remains accurate and effective as the scope of data expands.

The systems and methods described herein may further improve system security and data quality through the implementation of a fenced ingestion gateway that validates and sanitizes external inputs before integration. Traditional systems often lack mechanisms to prevent the introduction of harmful or malformed data, resulting in increased vulnerability to errors and security breaches. The fenced ingestion gateway in the present system may enforce a multi-stage validation process, including format checks, malware scanning, and compliance verification. Data that meets established criteria may be transmitted into the secure environment, while data that does not pass validation may be quarantined and excluded from further processing. The system may improve precision and responsiveness of workflows by linking the results of graph analysis to the generation of instruction sets that guide executable resources. Using a model that processes both historical and current data, the system may produce instruction sets containing structured data fields that reflect the latest analysis. When the system receives input related to these instruction sets, it may initiate processes such as isolating, blocking, or permitting network data instantiations according to the identified parameters.

FIG. 1 is a simplified diagram of an example method 100 for generating an instruction set and initializing an executable system resource, according to various embodiments. This method 100, as well as any other methods detailed throughout this disclosure, may be represented as a logical flow diagram in which each operation corresponds to a sequence of actions that may be realized in hardware, through computer instructions, or as a combination of both. When implemented as computer instructions, these operations may be encoded as computer-executable instructions stored on one or more non-transitory computer-readable storage media. When executed by one or more processors, these instructions may carry out the described operations. Computer-executable instructions may encompass, without limitation, routines, programs, objects, components, or data structures that implement designated functions or manage specific data types. The sequence in which these operations are described should not be interpreted as restrictive, and any subset of the outlined operations may be performed in various sequences and/or concurrently to achieve the described process. Furthermore, some, any, or all of the methods described herein may be executed under the direction of one or more computer systems that are programmed with particular executable instructions. Implementation may occur as code (e.g., executable instructions, computer programs, or applications) executing on one or more processors, as hardware, or as combinations of hardware and software. As previously discussed, code may reside on a non-transitory computer-readable storage medium, for example, in the form of computer instructions designed to perform the described processes.

At block 130, the method 100 may include the step of detecting a system generated event signal. The step may be performed by a computer. By way of a non-limiting example, an agentic system controller (ASC) 102 may detect a system-generated event signal 103 based at least in part on a machine-readable data stream that is associated with a user data structure (e.g., a profile or account associated with a user). The machine-readable data stream may be provided from remote data repositories (e.g., unsecure databases) and/or from local data repositories (e.g., secure databases), and may be triggered by an action or event associated with a client device 161. For example, the system-generated event signal may correspond to a scheduled interaction, an update to a user profile, a change in configuration, a scheduled interaction, or any other event that may be electronically logged or tracked within the system.

At block 132, the method 100 may include the step of generating a computer-generated graph data structure 108. The step may be performed by a computer. By way of a non-limiting example, ASC 102 may generate the computer-generated graph data structure 108 that includes a plurality of graph vertices and graph data structure linkages. A first group of graph vertices may represent data entries in metadata associated with logged interactions of the user data structure, and a second group of graph vertices may represent data entries associated with external system events. The computer-generated graph data structure 108 may be constructed in response to the system-generated event signal 103 and may capture data relationships between internal entries and external entries. For example, the computer-generated graph data structure 108 may connect an internal record of a scheduled maintenance activity with external alerts regarding external factors.

At block 134, the method 100 may include the step of causing a model to query the computer-generated graph data structure. The step may be performed by a computer. By way of a non-limiting example, ASC 102 may cause model 110 to query the computer-generated graph data structure 108 to analyze relationships among graph vertices and graph data structure linkages. Model 110 may be a machine learning model or another computational process and may query the computer-generated graph data structure 108 based at least in part on the system-generated event signal 103, the graph vertices, or the graph data structure linkages. Model 110 may produce an output that includes an enhanced feature set representing processed or combined attributes from the metadata associated with logged interactions and the metadata associated with external system events. For example, model 110 may identify risk factors, opportunities, or actionable insights based on the queried graph structure.

At block 136, the method 100 may include the step of generating an instruction set associated with a user data structure. The step may be performed by a computer. By way of a non-limiting example, ASC 102 may generate instruction set 111 that is associated with the user data structure. Instruction set 111 may include one or more structured data fields initialized with the enhanced feature set produced by model 110. Instruction set 111 may provide recommendations, guidance, or action items based on the analysis of the computer-generated graph data structure 108. Instruction set 111 may be formatted for delivery to a technician, operator, or digital assistant and may reference specific data relationships or patterns identified in the output of model 110.

At block 138, the method 100 may include the step of causing an executable system resource to be initiated. The step may be performed by a computer. By way of a non-limiting example, upon receiving an input associated with instruction set 111, ASC 102 may cause an executable system resource to be initiated. The executable system resource may include launching a software process, updating a graphical user interface, sending a notification, or executing a command in response to instruction set 111 e.g., isolating, blocking, or permitting a network data instantiation (e.g., allowing transfer of an asset associated with the user data structure). The initiation of the executable system resource may be contingent on user interaction, automated triggers, or confirmation from another component of the system and may act based at least in part on the guidance encoded within instruction set 111.

II. Illustrative Systems

Figure 2:
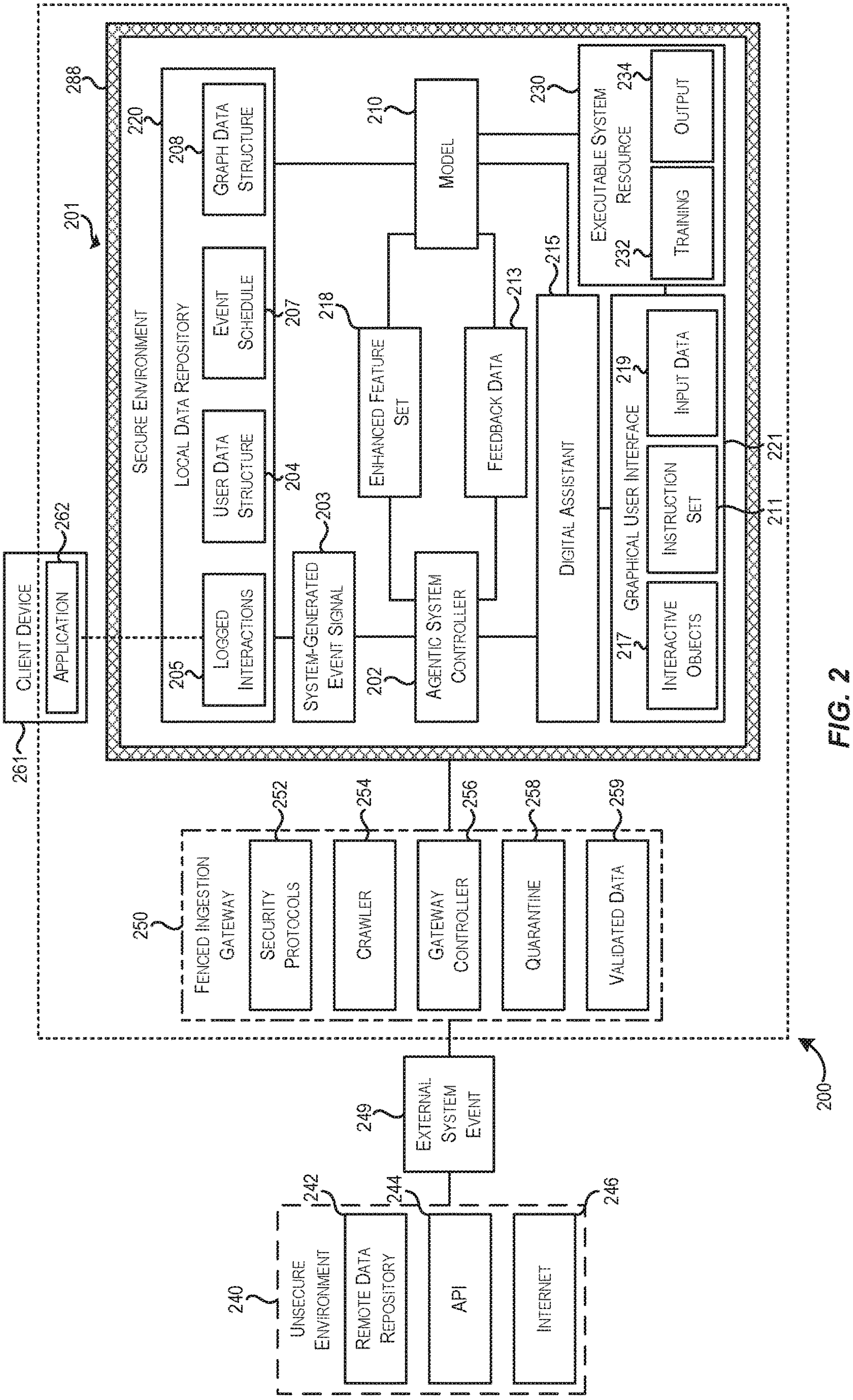
FIG. 2 is a simplified diagram of example system for generating an instruction set and initializing an executable system resource, according to various embodiments.

FIG. 2 is a simplified diagram of example system 200 for generating an instruction set and initializing an executable system resource, according to various embodiments. An ASC 202 may be deployed within a secure environment 201, which may be protected by a firewall 288 to restrict unauthorized access and safeguard sensitive data. The ASC 202 may monitor and detect logged interactions 205 generated by an application 262 running on a client device 261, e.g., a smart phone or tablet, that operates outside the secure environment 201. The application 262 may be controlled by the system 200, with appropriate user permissions, while the client device 261 may be a third-party device outside of the control of the system 200. These logged interactions 205 may include scheduled activities, user-initiated actions, configuration changes, or other electronically recorded events that are associated with a user data structure 204. The system-generated event signal 203 may be generated or detected by ASC 202 based at least in part on the logged interactions 205, and may indicate that a significant event or activity has occurred that warrants further processing or analysis.

The logged interactions 205, along with user data structures 204, event schedules 207, and computer-generated graph data structures 208, may be stored in a local data repository 220 within the secure environment 201. The local data repository 220 may serve as a central repository for internal records, allowing ASC 202 to retrieve and correlate data associated with past and present activities. For example, user data structures 204 may represent the digital profile of a user, including product associations, device information, or historical activity logs. Event schedules 207 may track upcoming or past events relevant to the user data structure 204, e.g., maintenance appointments, scheduled meetings, or system updates. The computer-generated graph data structures 208 may encode relationships among various pieces of internal and external data, supporting analysis and visualization.

The system-generated event signal 203 may also be triggered by an external system event 249 that is tracked in some manner within the unsecure environment 240. For example, an external alert regarding real-world conditions or developments may prompt ASC 202 to initiate a new workflow. The fenced ingestion gateway 250 may scrub external data and apply validation checks to ensure that only safe and verified information is transmitted to the secure environment 201. Data that fails validation may be quarantined and prevented from impacting internal operations, supporting stringent data isolation and compliance requirements.

ASC 202 may interact with or serve as a digital assistant 215, which may be tasked with generating or updating the computer-generated graph data structure 208. The computer-generated graph data structure 208 may include graph vertices that represent first metadata, e.g., internal data associated with logged interactions of the user data structure 204. Additionally, or alternatively, the computer-generated graph data structure 208 may include graph vertices that represent second metadata, e.g., external data associated with external system events 249. Graph data structure linkages may connect graph vertices between the first metadata and the second metadata, uncovering data relationships that may not have been previously identified prior to the occurrence of the external system event 249. For example, a graph data structure linkage may connect a scheduled device maintenance event, as recorded in the logged interactions 205, with an external alert regarding real-world events, as captured from an external system event 249. This connection may provide context for understanding how internal activities may be influenced by external developments, supporting more comprehensive analysis and decision-making within the secure environment 201.

A model 210 may be invoked by the ASC 202 or by the digital assistant 215 to query the computer-generated graph data structure 208. The model 210 may analyze the relationships among graph vertices representing the first metadata and graph vertices representing the second metadata, as well as the graph data structure linkages connecting them. The model 210 may be a machine learning model, statistical algorithm, or other computational process. The model 210 may query the computer-generated graph data structure 208 based at least in part on the system-generated event signal 203, the graph vertices, or the graph data structure linkages, and may produce an output that includes an enhanced feature set 218. The enhanced feature set 218 may include processed or combined attributes from the first metadata and the second metadata, providing a richer context for subsequent actions. For example, the model 210 may identify correlations between internal activity logs and external alerts, highlight patterns, or suggest responses relevant to the user data structure 204.

The ASC 202 may generate an instruction set 211 associated with the user data structure 204 based on the output of the model 210. The instruction set 211 may include one or more structured data fields populated with attributes from the enhanced feature set 218. The instruction set 211 may serve as a guide, recommendation, or action item for a technician, operator, administrator, or other user. The instruction set 211 may reference specific data relationships or patterns identified by the model 210 and may be formatted for delivery through various system interfaces. For example, the instruction set 211 may prompt a review of recent activity, suggest preparation for an upcoming event, or recommend further investigation based on integrated internal and external information.

The ASC 202 may cause digital assistant 215 to generate graphical user interface (GUI) 221 that includes interactive objects 217. The GUI 221 may display interactive objects 217 as buttons, links, or other actionable elements, enabling a user to review recommendations, select options, or provide feedback. User interaction with interactive objects 217 may trigger ASC 202 to initiate executable system resource 230. For example, a user (e.g., an administrator, a different user from the user of client device 261, etc.) may select an interactive object 217 to generate additional visualizations, initiate isolation or blocking of a network data instantiation (e.g., output 234), start training 232 for model 210 (e.g., to generate a trained machine learning model), or execute other processes based on input data 219. The GUI 221 may facilitate both review and action, supporting real-time engagement with instruction set 211 and operational workflows.

Users may provide feedback (e.g., feedback data 213) to ASC 202 or to model 210 in response to instruction set 211. Feedback data 213 may indicate the effectiveness of recommended actions, identify areas requiring more information, or suggest modifications to future instruction sets 211. Feedback data 213 may be incorporated into computer-generated graph data structure 208, supporting iterative improvement and ongoing adaptation of system recommendations. For example, a technician may note that a suggested review was helpful or that additional context is needed for a particular event, prompting updates to computer-generated graph data structure 208 and adjustment of subsequent analysis.

In various embodiments, the executable system resource 230 may be initiated based on user interaction with the GUI 221 or based on automated triggers by the ASC 202. The executable system resource 230 may include processes e.g., generating graphs, isolating or blocking network data instantiations, initiating training of model 210, updating user profiles, or sending notifications. Initiation of executable system resource 230 may rely on guidance encoded within instruction set 211, confirmation from other system components, or direct user input. This operational flexibility may support workflows that respond to evolving internal and external conditions.

The secure environment 201, protected by the firewall 288 and accessed through the fenced ingestion gateway 250, may ensure that sensitive internal information remains isolated from unverified or potentially harmful external data. The fenced ingestion gateway 250 may include security protocols 252, crawlers 254, gateway controllers 256, quarantines 258, and validated data 259 to mediate access to the remote data repository 242 and transmission of the second metadata associated with the external system events 249. Data that passes validation may be integrated into computer-generated graph data structure 208, while data that fails validation may be quarantined and excluded from further processing.

In various embodiments, the system-generated event signal 203, triggered by logged interactions 205 or the external system events 249, may initiate workflows that integrate and analyze data from both internal and external sources. By constructing and querying computer-generated graph data structure 208, generating enhanced feature sets 218, and producing instruction sets 211, the system may facilitate informed decision-making and responsive action. The GUI 221, interactive objects 217, and feedback data 213 may enable user engagement and ongoing refinement, supporting operational activities within secure environment 201 as discussed in more detail below.

a. Illustrative Secure Environments

The secure environment 201 may be implemented as an isolated computing infrastructure designed to protect sensitive internal information and system resources from unauthorized access and external threats. Secure environment 201 may include, without limitation, a dedicated set of servers, virtual machines, cloud-based containers, on-premises hardware, or combinations thereof. The secure environment 201 may support multi-layered access controls, e.g., authentication and authorization protocols, digital certificates, encrypted communications, and secure key management. These access controls may restrict entry to only authorized users, devices, and applications, while logging all access attempts and interactions for audit and compliance purposes. Secure environment 201 may maintain a local data repository 220, which may store logged interactions 205, user data structures 204, event schedules 207, and computer-generated graph data structures 208. By housing these elements within secure environment 201, the system may ensure that data integrity and confidentiality are maintained, even when interacting with external sources or client devices 261 located outside the secure environment 201.

Interactions between the secure environment 201 and other system components may be carefully managed to prevent exposure to unverified or potentially harmful content. For example, when ASC 202 requests access data from a remote data repository 242 in an unsecure environment 240, the secure environment 201 may rely on a fenced ingestion gateway 250 to validate and sanitize incoming information. The fenced ingestion gateway 250, as described in more detail later, may serve as a boundary that enforces security protocols 252, crawlers 254, gateway controllers 256, quarantines 258, and validated data 259. Data passing through fenced ingestion gateway 250 may undergo validation checks, e.g., format verification, malware scanning, and compliance with organizational policies. Only validated data may be transmitted into secure environment 201 for integration into computer-generated graph data structure 208 or for subsequent analysis by model 210. Data that fails validation may be quarantined by fenced ingestion gateway 250, ensuring that secure environment 201 remains insulated from threats originating outside the secure perimeter. The secure environment 201 may also support encrypted data transmission, periodic security reviews, and automatic updates to maintain operational safety and compliance.

The firewall 288 may provide protection and/or an additional layer of protection for the secure environment 201 by acting as a network boundary that restricts unauthorized access and monitors incoming and outgoing traffic. The firewall 288 may be implemented as a hardware appliance, software-based firewall, or a combination of both, and may operate in conjunction with other network security components, e.g., intrusion detection systems, intrusion prevention systems, and virtual private networks. The firewall 288 may enforce rules that limit access to secure environment 201 based on source and destination addresses, port numbers, protocol types, and user credentials. For example, firewall 288 may permit communication between ASC 202 and digital assistant 215, while blocking attempts to access secure environment 201 from unknown or untrusted sources. The firewall 288 may work in tandem with fenced ingestion gateway 250 to provide layered security, ensuring that only authenticated and validated data may enter secure environment 201. In the event of a detected security breach or anomalous activity, firewall 288 may isolate affected segments, log security events, and trigger alerts to system administrators for rapid response and mitigation. By integrating the firewall 288 with the broader architecture of secure environment 201, the system may provide comprehensive protection for internal data, system resources, and operational workflows.

b. Illustrative Fenced Ingestion Gateway

The fenced ingestion gateway 250 may act as a boundary mechanism that governs the flow of data from the unsecure environment 240 into the secure environment 201. The fenced ingestion gateway 250 may be implemented as hardware, a virtual machine process, a cloud-based secure enclave, or another suitable equivalent. Data arriving from the unsecure environment 240, including sources e.g., the remote data repository 242, APIs 244, and the internet 246, may be processed by the fenced ingestion gateway 250. The fenced ingestion gateway 250 may initiate a series of processing steps that include, without limitation, format verification, malware scanning, digital signature validation, and compliance checks against organizational policies. The fenced ingestion gateway 250 may be responsible for maintaining an audit trail of all inbound transmissions, controlling session access, and supporting resource allocation for concurrent data streams. The gateway may rely on input from security protocols 252, crawler 254, gateway controller 256, quarantine 258, and validated data 259 to manage the ingestion process from start to finish.

As previously mentioned, within the fenced ingestion gateway 250, incoming data may be subject to security protocols 252 that define the rules for authentication, authorization, and validation. The fenced ingestion gateway 250 may use crawlers 254 to retrieve and index data from external sources, generating metadata about the data's provenance, structure, and context. After initial retrieval, the gateway controller 256 may coordinate the sequence of validation checks, ensuring that all security protocols 252 have been observed before permitting further processing. Data that does not meet validation checks may be placed in quarantine 258, where it may be reviewed, cleansed, or discarded according to retention policies. Only data that passes all validation steps may be designated as validated data 259. The gateway controller 256 may manage communication between the secure environment 201, the firewall 288, and the unsecure environment 240, logging actions for audit purposes and supporting real-time monitoring by system operators.

When data is designated as validated data 259, the fenced ingestion gateway 250 may perform additional operations to convert, package, or otherwise modify the data for integration into the secure environment 201. Validated data 259 may be transformed into the second metadata by extracting relevant fields, attaching validation tags, and formatting the payload according to system requirements. This transformation may include, without limitation, removing extraneous information, standardizing data types, or encapsulating the validated data 259 in a secure payload for transmission. The converted second metadata may be appended to the local data repository 220, integrated into the user data structure 204, or incorporated into the computer-generated graph data structure 208. The process for handling validated data 259 may be designed to accommodate new data types, evolving security standards, and updates to compliance requirements, maintaining the integrity and reliability of the secure environment 201.

The security protocols 252 may define the rules and steps for validating incoming data from the unsecure environment 240. The security protocols 252 may include encryption standards, digital signature checks, SSL or TLS handshakes, schema validation, malware scanning, and compliance checks with internal policies. The security protocols 252 may be selected based on the data source, the type of payload, or the sensitivity of the information being transmitted. In some scenarios, security protocols 252 may trigger automated responses, e.g., request throttling or session termination, if a security protocol violation is detected. Security protocols 252 may operate in with the firewall 288 to ensure only authorized and validated data 259 enters the secure environment 201.

The crawler 254 may retrieve, index, and preprocess data from external sources in the unsecure environment 240. Crawler 254 may operate as a scheduled agent, an event-driven process, or a hybrid configuration. Crawler 254 may access data from external system events 249, public databases, APIs 244, or remote data repository 242, respecting access permissions and authentication requirements. After retrieval, crawler 254 may generate metadata describing provenance, structure, and context, supporting downstream validation and integration into the computer-generated graph data structure 208. Crawler 254 may also support incremental updates, error recovery, and adaptive polling strategies to optimize bandwidth and minimize latency.

Gateway controller 256 may manage communication between the secure environment 201, the firewall 288, and the unsecure environment 240. Gateway controller 256 may initiate sessions, track states, and route data packets between the fenced ingestion gateway 250 and network segments. Gateway controller 256 may enforce access controls, ensure compliance with connection policies, and allocate resources for concurrent streams. In response to anomalies or threats, gateway controller 256 may isolate segments, direct data to quarantine 258, or block communication attempts. Gateway controller 256 may provide monitoring dashboards and administrative controls for real-time oversight.

Quarantine 258 may be a protected storage area within the fenced ingestion gateway 250, dedicated to holding unverified, suspicious, or non-compliant data that fails validation checks. Data placed in quarantine 258 may be subject to further analysis, manual review, or automated remediation. Quarantine 258 may support forensic investigation, data cleansing, or notification workflows. Data may remain in quarantine 258 until validated and released or discarded according to retention policy. Quarantine 258 may ensure that harmful or malformed content does not reach the secure environment 201 or the computer-generated graph data structure 208.

Validated data 259 may refer to any data that has passed validation checks by security protocols 252 and additional validations imposed by the fenced ingestion gateway 250. Validated data 259 may be tagged with metadata recording the validation steps, time, and contextual information. Upon entry to the secure environment 201, validated data 259 may be integrated into the local data repository 220, appended to the user data structure 204, or incorporated into the computer-generated graph data structure 208 as second metadata. Validated data 259 may be transformed or packaged as needed to match system preferences and support subsequent analysis by model 210, presentation through graphical user interface 221, or use in generating enhanced feature set 218 and instruction set 211. The handling of validated data 259 may be extensible to new data types, security standards, or compliance requirements.

Validation checks within the fenced ingestion gateway 250 may involve a multi-stage process that systematically examines each incoming data payload for compliance with organizational security, data integrity, and policy requirements. When data is received from the unsecure environment 240, security protocols 252 may initiate the validation process by performing format verification to ensure that the structure of the payload matches expected schemas or data models. For example, the system may require that all incoming records from remote data repository 242 contain specific fields, e.g., timestamps, source identifiers, and data type declarations. If a field is missing or malformed, the data may be flagged for further review or redirected to quarantine 258.

After confirming that the format is valid, the validation process may proceed to content inspection and threat detection. Malware scanning may be performed using signature-based and heuristic analysis tools to identify known or suspicious patterns in the payload. Digital signatures and checksums may be verified to ensure the authenticity and integrity of the data. For example, if the payload originates from a third party API 244, the system may check that the digital signature matches a trusted authority and that the checksum corresponds to the expected value. If a payload includes an executable script or binary attachment, the system may establish a threshold for allowed types and sizes. Payloads exceeding a defined threshold (e.g., files larger than 10 MB or containing unrecognized executable content) may be automatically sent to quarantine 258 or subject to manual review.

The validation check may also include semantic checks and compliance assessments based on organizational or regulatory requirements. For instance, the system may have a restriction that all data received from an external system event 249 comply with a specified accuracy threshold (e.g., within 70% expected value). The system may also check that the payload does not include prohibited content, e.g., personally identifiable information, unless appropriate encryption and anonymization protocols are in place. If the data includes time-sensitive information, the system may verify that the timestamp is within an acceptable window (e.g., within the past 24 hours) to ensure freshness and relevance. When validation checks involve comparing data against internal baselines or historical records, the system may set thresholds for acceptable variance. For example, if an external data payload reports a change in status for a monitored device, the system may check that the reported value does not deviate from previous records by more than a specified percentage, e.g., 15 percent, unless supporting evidence is provided.

Data that passes a threshold amount of validation checks (e.g., greater than 90%) is designated as validated data 259. At this stage, the fenced ingestion gateway 250 may perform a series of post-validation processing steps to transform the validated data 259 into the second metadata for integration within the secure environment 201. The transformation process may include, without limitation, standardizing data types (e.g., converting date formats, normalizing units of measurement), extracting relevant fields for further analysis, and stripping extraneous or redundant information that is not necessary for downstream workflows. The system may attach validation tags to the payload, documenting the specific validation checks completed, the time of validation, and the identity of the validating agent or process.

In addition to formatting and tagging, the system may encapsulate validated data 259 in a secure payload for transmission to the secure environment 201. This encapsulation may involve encrypting the payload, applying integrity checksums, and generating metadata that outlines the origin, validation history, and intended use of the second metadata. Upon arrival in the secure environment 201, the second metadata may be appended to the local data repository 220, directly passed to the ASC 202, associated with the user data structure 204, or incorporated as graph vertices in the computer-generated graph data structure 208. The transformation process may be adaptive, allowing for the introduction of new validation rules, data types, or integration pathways as organizational needs evolve.

The system may maintain an auditable log of all validation activities, capturing details e.g., the thresholds applied, validation outcomes, and any exceptions handled. This log may be reviewed by administrators for compliance, troubleshooting, or optimization of validation strategies. If a validation check fails and the data is placed in quarantine 258, the system may record the reasons for failure and, if appropriate, notify designated personnel for manual intervention. This validation framework helps ensure that only high-integrity, policy-compliant data contributes to the generation of enhanced feature sets 218 and instruction sets 211.

c. Illustrative Local Data Repository

In various embodiments, the local data repository 220 may be a central storage and management platform for internal data within the secure environment 201. The local data repository 220 may include, without limitation, logged interactions 205, user data structures 204, event schedules 207, and computer-generated graph data structures 208. The repository may be implemented as a database system, a distributed storage array, a cloud-based container, or another suitable equivalent. Access to the local data repository 220 may be governed by multi-layered authentication and authorization protocols, ensuring that only authorized components, e.g., ASC 202 and digital assistant 215, may retrieve or update records. The repository may support encrypted storage, version control, backup and recovery procedures, and audit logging of all data access and modification events. In various embodiments, the local data repository 220 may be one database or may be several databases.

The local data repository 220 may interact with other suitable components. For example, when ASC 202 detects a system-generated event signal 203 based on logged interactions 205, the ASC 202 may retrieve relevant user data structures 204 and event schedules 207 to contextualize the system-generated event signal 203. The repository may also host computer-generated graph data structures 208, which may encode relationships among internal and external data. The local data repository 220 may synchronize with the fenced ingestion gateway 250 to incorporate the second metadata derived from external system events 249. When a user interacts with graphical user interface 221 or provides feedback data 213, updates may be written to the repository for ongoing refinement and adaptation. The repository may support query optimization, indexing, and data partitioning to maintain high performance and scalability as data volumes and complexity grow.

The logged interactions 205 may be records of activities, events, or actions performed in applications 262 by input from client devices 261 or by processes within the secure environment 201. Logged interactions 205 may include, without limitation, scheduled activities, user-initiated operations, configuration changes, system updates, periodic reviews, or any electronically recorded event associated with a user data structure 204. Each logged interaction 205 may be timestamped, assigned a unique identifier, and annotated with metadata e.g., device information, session parameters, event source, or operational outcome. The logging process may capture both real-time and historical interactions, providing ASC 202 with a record for event detection, workflow initiation, and compliance monitoring. Logged interactions 205 may be stored in the local data repository 220 in a structured format.

The logged interactions 205 may provide foundational data for event detection and contextual analysis. When ASC 202 detects a system-generated event signal 203, logged interactions 205 may be analyzed to determine the scope, impact, and associated user data structures 204. For example, a logged interaction 205 representing a scheduled maintenance event may be cross-referenced with event schedules 207 and computer-generated graph data structures 208 to identify dependencies. Logged interactions 205 may also serve as labeled data for training model 210, supporting pattern recognition and feature extraction. Retention policies and automated cleansing may be applied to maintain the integrity and relevance of logged interactions 205 in the repository.

The user data structures 204 may represent the digital profile, product associations, device relationships, and historical activity of a user or entity within the system that may use the application 262, but not limited to using the application 262. Each user data structure 204 may include, without limitation, unique identifiers, descriptive attributes, device associations, configuration settings, linked activity logs, and references to relevant event schedules 207 or computer-generated graph data structures 208. The user data structures 204 may be stored in the local data repository 220 and accessed by ASC 202, digital assistant 215, and other authorized components for workflow execution, analysis, and reporting. The user data structures 204 may be flexible to accommodate new data types or organizational requirements. Updates to the user data structures 204 may occur in response to logged interactions 205, validated second metadata from external system events 249, or feedback from technicians and administrators.

User data structures 204 may serve as anchor points for personalized workflows and targeted actions. When the ASC 202 generates an instruction set 211, for example, based on the output of model 210, the instruction set 211 may be associated with a specific user data structure 204, enabling guidance or recommendations to be generated. User data structures 204 may facilitate privacy management, auditability, and granular control over data access and modification. When feedback data 213 is provided, user data structures 204 may be updated for ongoing refinement. Integration of user data structures 204 within the repository may support comprehensive analysis and adaptive workflows across the secure environment 201.

The event schedules 207 may maintain records of upcoming, ongoing, or past events associated with user data structures 204 or other resources. Event schedules 207 may include, without limitation, product appointments, scheduled meetings, updates, periodic reviews, or any other time-based activity tracked by the system. Each event schedule 207 may be timestamped, assigned a unique identifier, and annotated with contextual information e.g., event type, priority, location, and associated user data structures 204. Event schedules 207 may be stored in the local data repository 220, allowing ASC 202 and digital assistant 215 to retrieve and reference relevant events for workflow execution or instruction set 211 generation.

Event schedules 207 may support proactive planning, workflow coordination, and timely response to system-generated event signals 203. When referenced in a logged interaction 205, event schedules 207 may be cross-referenced with user data structures 204 and computer-generated graph data structures 208 to contextualize the event. Event schedules 207 may be updated in response to validated second metadata from external system events 249. Technicians and administrators may review or modify event schedules 207 through graphical user interface 221, supporting collaborative planning and adaptive operations.

Figure 3:
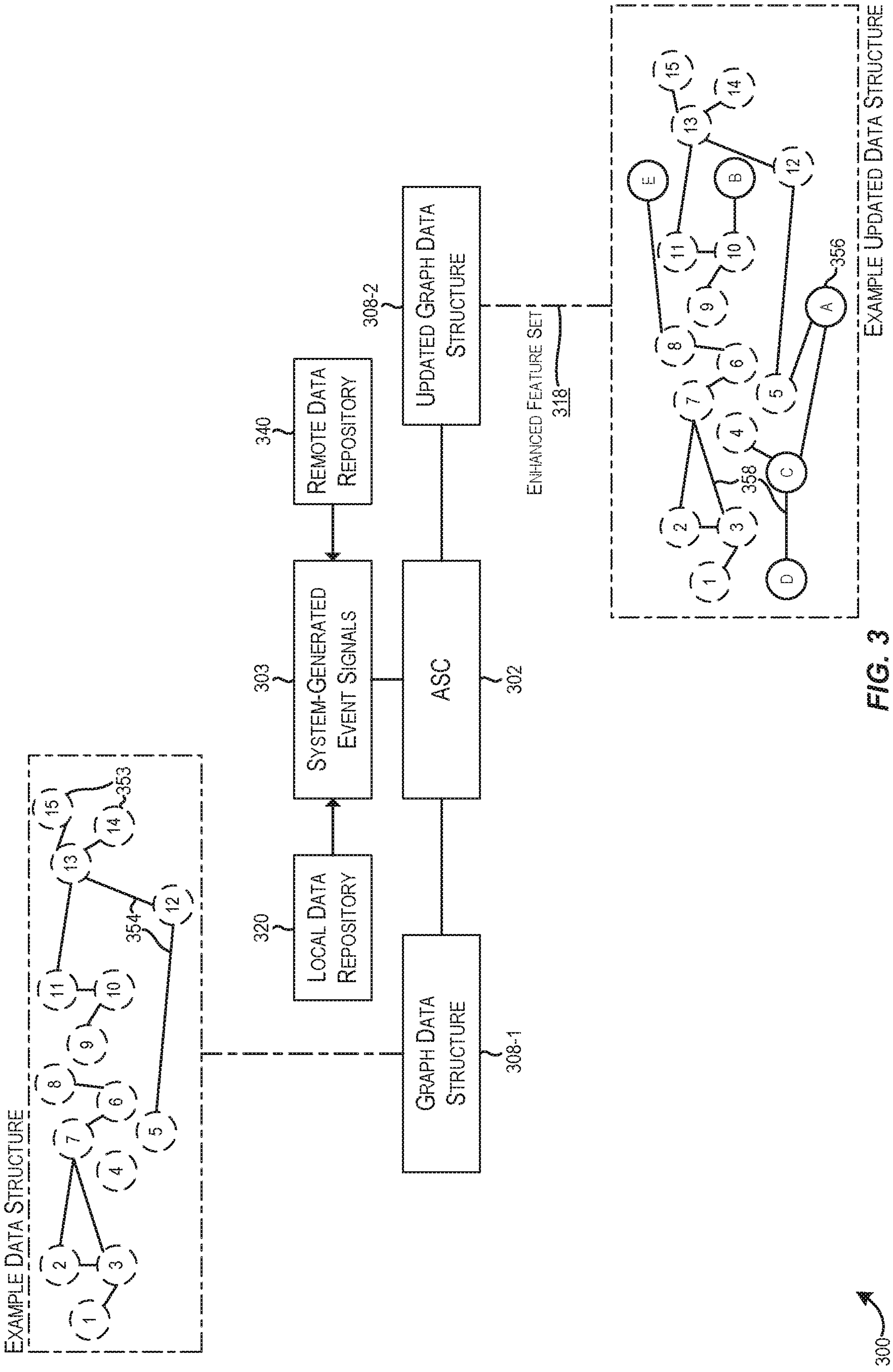
FIG. 3 is a simplified diagram of example graph network that is generated using data from a local data repository and a remote data repository, according to various embodiments.

Computer-generated graph data structures 208, discussed in more detail with respect to FIG. 3, may encode relationships among internal and external data elements, supporting analysis, visualization, and decision-making. Each computer-generated graph data structure 208 may include graph vertices representing first metadata (e.g., logged interactions 205, user data structures 204, and event schedules 207) and graph vertices representing second metadata (e.g., validated second metadata from external system events 249). Graph data structure linkages may connect vertices across internal and external boundaries, uncovering latent relationships, dependencies, or patterns. The graph data structure 208 may be generated or updated by the ASC 202 or the digital assistant 215, stored in the local data repository 220, and referenced during instruction set 211 generation and GUI 221 presentation.

The computer-generated graph data structures 208 may facilitate integration and correlation of diverse data sources, enabling ASC 202 to generate enhanced feature sets 218 and actionable instruction sets 211. When a system-generated event signal 203 is detected, ASC 202 may query the graph data structure 208 to identify relationships, extract features, and contextualize the event. The graph data structure 208 may be updated in response to feedback data 213, allowing iterative refinement. Visualization tools within graphical user interface 221 may enable users to review graph data structures 208, explore relationships, and interact with actionable elements.

d. Illustrative Digital Assistants

In various embodiments, the digital assistant 215 may operate as an interactive agent within the secure environment 201, assisting users e.g., administrators, technicians, or operators in responding to, but not limited to, system-generated event signals 203. The digital assistant 215 may function as a chat bot, conversational interface, or agentic process that can be invoked automatically when a system-generated event signal 203 is detected by the ASC 202. In some embodiments, the digital assistant 215 may be instantiated as a standalone process, while in others, the digital assistant 215 and the ASC 202 may be integrated as a single entity, sharing resources and operational responsibilities. The digital assistant 215 may facilitate user engagement by presenting relevant information, guiding workflow steps, and translating system-generated event signals 203 into actionable instructions and recommendations.

When a system-generated event signal 203 is detected (e.g., an administrator requests information, an event is scheduled via event schedule 207, etc.), the digital assistant 215 may automatically initiate a session to assist the user.

The digital assistant 215 may retrieve relevant data from the local data repository 220, including logged interactions 205, user data structures 204, event schedules 207, and computer-generated graph data structures 208. The digital assistant 215 may contextualize the event by referencing the instruction set 211 generated by the ASC 202 and/or model 210, and may present a summary report, guidance, or recommendations through the graphical user interface 221. The digital assistant 215 may highlight the most pertinent features of the enhanced feature set 218 and may display interactive objects 217, e.g., buttons, links, or actionable items, to enable the user to review, modify, or initiate system actions.

The digital assistant 215 may accept natural language queries from the user, processing questions or commands through a conversational interface. The user may type, speak, or select options to request additional information, clarify system recommendations, or inquire about historical data. The digital assistant 215 may parse the natural language query, retrieve relevant records from the local data repository 220 or external system events 249, and present contextually appropriate responses. For example, if the user asks about the impact of a recent external alert, the digital assistant 215 may summarize the relevant second metadata, display associated logged interactions 205, and suggest recommended actions based on instruction set 211.

A portion of the digital assistant 215 may be displayed on the graphical user interface 221, either as a persistent sidebar, pop-up window, or integrated chat area. The digital assistant 215 may update the GUI 221 based on the system-generated event signal 203, the instruction set 211, and real-time user interactions. The digital assistant 215 may organize information into sections, e.g., summaries, risk factors, opportunities, and action items, providing an intuitive workflow for the user to review, acknowledge, or initiate further steps. The digital assistant 215 may also facilitate navigation between different reports, historical events, and data visualizations, adapting its interface to the context and needs of the user.

The digital assistant 215 may support multi-modal interaction, allowing users to interact through text, voice, or graphical elements. When the user interacts with interactive objects 217, the digital assistant 215 may prompt ASC 202 to initiate an executable system resource 230, e.g., without limitation, generating graphs, isolating network data instantiations, updating user profiles, or sending notifications. The digital assistant 215 may provide confirmation dialogs, progress indicators, and feedback mechanisms, ensuring that users are informed about system actions and outcomes. The digital assistant 215 may also support collaborative workflows, enabling multiple users to interact with the system concurrently and exchange information or recommendations.

In addition to facilitating immediate response to system-generated event signals 203, the digital assistant 215 may support ongoing monitoring, proactive alerts, and periodic review processes. The digital assistant 215 may track user interactions, log feedback data 213, and update user data structures 204 or event schedules 207 as new information becomes available. The digital assistant 215 may aggregate feedback from multiple sessions to refine system recommendations, improve instruction set 211 generation, and support adaptive learning by model 210. The digital assistant 215 may also notify users of upcoming events, changes in status, or potential risks identified by querying computer-generated graph data structures 208.

The digital assistant 215 may interact with the ASC 202 and model 210 to incorporate the latest analysis, recommendations, and action items. When the digital assistant 215 receives a new system-generated event signal 203, the digital assistant 215 may invoke, via ASC 202, model 210 to query computer-generated graph data structures 208 and generate an enhanced feature set 218. The digital assistant 215 may display the results, explain the reasoning behind recommendations, and allow users to request additional information or clarification. The digital assistant 215 may facilitate iterative refinement, enabling users to provide feedback (e.g., feedback data 213), request alternative actions, escalate issues for further review, or suitable equivalents.

The digital assistant 215 may provide auditability and traceability for all interactions, recording session transcripts, user queries, system responses, and actions taken. This record may be stored in the local data repository 220 and referenced for compliance, troubleshooting, or optimization of system workflows. The digital assistant 215 may support export of reports, summaries, or action logs for review by administrators, or suitable equivalents.

The digital assistant 215 may be extensible to support new data types, organizational requirements, or evolving user needs. The digital assistant 215 may integrate with external authentication systems, notification services, or collaborative platforms, expanding its functionality and accessibility. The digital assistant 215 may also support automated escalation procedures, routing complex issues to designated specialists or invoking additional system resources as needed.

e. Illustrative Models

The model 210 may be a computational engine that performs extracting, analyzing, and synthesizing information from the computer-generated graph data structure 208. The model 210 may be implemented as a machine learning model, a neural network, an ensemble of statistical algorithms, or another suitable equivalent, depending on the complexity and preferences of the system. The model 210 may receive, as input, the computer-generated graph data structure 208, which is constructed using first metadata (e.g., logged interactions 205, user data structures 204, and event schedules 207) and second metadata (e.g., validated data 259 originating from external system events 249). The model 210 may be invoked by the ASC 202 or by the digital assistant 215 in response to a system-generated event signal 203, or as part of a scheduled or on-demand analysis workflow.

The process of preparing data for the model 210 may involve categorizing and annotating a subset of the computer-generated graph data structure 208 as labeled data. Labeled data may include graph vertices or data records that have been manually or programmatically tagged with ground truth information, e.g., outcome categories, risk levels, event types, or other attributes of interest. For example, historical logged interactions 205 that resulted in successful or unsuccessful system outcomes may be labeled for supervised training purposes. Unlabeled data may include new or unclassified graph vertices, edge relationships, or second metadata that have not been associated with specific outcomes. The combination of labeled and unlabeled data may enable the model 210 to learn patterns, infer relationships, and generalize data.

Training of the model 210 may occur in discrete phases, e.g., initial supervised learning, semi-supervised learning, or ongoing fine-tuning. During supervised learning, the model 210 may ingest labeled data from the computer-generated graph data structure 208, process this data through one or more layers (e.g., input, hidden, and output layers in a neural network), and learn to map input features to target outcomes. The model 210 may use embeddings to represent graph vertices, node attributes, or edge relationships as dense, multi-dimensional vectors. These embeddings may capture semantic similarity, contextual relevance, and latent structure within the data. The model 210 may employ iterative optimization algorithms, e.g., stochastic gradient descent or backpropagation, to minimize loss functions and improve predictive accuracy. The training process may involve cross-validation, hyperparameter tuning, dropout regularization, and other techniques to prevent overfitting and enhance generalizability.

For semi-supervised or unsupervised learning, the model 210 may incorporate unlabeled data from the computer-generated graph data structure 208, leveraging graph-based clustering, dimensionality reduction, or self-supervised learning methods. By analyzing both labeled and unlabeled data, the model 210 may detect previously unknown patterns, discover new relationships, or generate embeddings for unclassified vertices. Iterative training cycles may be performed as new data is ingested, feedback data 213 is received, or system preferences change. Feedback data 213, provided by users, administrators, or external evaluation modules, may be used to update labels, correct model predictions, or adjust feature weights. Feedback data 213 may be incorporated into the graph data structure 208 providing continuous improvement of the model 210 through reinforcement learning or online training methods.

Once the model 210 is trained or fine-tuned, it may be deployed to production systems for use in real-time or batch inference. Deployment may involve serializing the model 210, transferring model weights and parameters to other instances of ASC 202 or digital assistant 215, and integrating the model 210 with system APIs. The model 210 may be deployed across multiple environments, including cloud platforms, edge devices, or on-premises hardware, to support distributed processing, redundancy, and failover capabilities. The model 210 may expose configurable parameters, logging interfaces, and monitoring hooks, enabling administrators to track performance, detect drift, and trigger retraining as needed.

When invoked, the model 210 may process the input computer-generated graph data structure 208 by traversing graph vertices, evaluating edge weights, and extracting relevant features based on the current system-generated event signal 203. The model 210 may consider both direct and indirect relationships among the first metadata and second metadata, applying learned embeddings to characterize the context of the event. The model 210 may aggregate, filter, or score features, producing an enhanced feature set 218 that summarizes risks, opportunities, dependencies, or recommended actions. For example, the model 210 may identify that a recent external system event 249 is linked to a cluster of logged interactions 205 and user data structures 204, suggesting a need for immediate review or intervention.

The enhanced feature set 218 may be produced by supplying both the first metadata and the second metadata as input to the model 210. The first metadata may include internal data e.g., logged interactions 205, user data structures 204, and event schedules 207, while the second metadata may include validated data 259 that originates from external system events 249. These two sets of metadata are represented as graph vertices within the computer-generated graph data structure 208, and the connections between these vertices (e.g., known as graph data structure linkages) encode the relationships across internal and external data sources. When the model 210 is invoked, the ASC 202 or the digital assistant 215 may generate a prompt that specifies which graph vertices, relationships, or data ranges are relevant based on the context of the system-generated event signal 203.

The construction of this prompt may involve referencing the types of events, the time windows, or the attributes of interest associated with the system-generated event signal 203. For example, the prompt may direct the model 210 to analyze how a newly validated external alert interacts with recent device maintenance logged in the user data structures 204, or how a sequence of user actions corresponds to external conditions. The model 210 may traverse the computer-generated graph data structure 208, considering both the direct connections (e.g., a maintenance event linked to an external system alert) and indirect associations (e.g., clusters or paths that bridge multiple types of data). The model 210 may use learned embeddings, relational scoring functions, or similarity metrics to identify dependencies, co-occurrences, or outliers that carry significance for the operational context. This analysis is not limited to static relationships, but may also highlight temporal trends, anomaly detection, or emerging clusters of activity that are relevant to the system-generated event signal 203.

In various embodiments, the ASC 202 may evaluate whether the computer-generated graph data structure 208 contains sufficient information to support the generation of an instruction set that is both comprehensive and contextually meaningful. Upon receiving the output from an initial query of the graph data structure 208 by the model 210, the ASC 202 may assess the enhanced feature set for indicators of missing attributes, unresolved references, or low-confidence relationships. The model 210 may provide metadata, flags, or scoring information that signal whether particular entities, events, or attributes referenced in the graph are incomplete or absent. For instance, if the model 210 identifies a relationship involving an external organization, but the corresponding organizational metadata is not present in the current graph, the ASC 202 may recognize that further information is required.

In various examples, the ASC 202 may determine that additional data may be preferable and the ASC 202 may formulate a supplemental query or request. The query or request may be directed toward internal data repositories, such as the local data repository 220, or toward external sources accessible through the fenced ingestion gateway 250. The supplemental query may specify the type of information required, such as recent logged interactions, expanded user data structure attributes, or external records relevant to the identified entity or event. The ASC 202 may generate this query based on the context of the system-generated event signal 203, as well as any gaps or insufficiencies identified in the initial enhanced feature set.

Upon executing the supplemental query, the ASC 202 may receive additional data, which may then be subject to validation, sanitization, and transformation as described previously for external sources. Once validated, the new data may be incorporated into the computer-generated graph data structure 208 as new vertices or linkages to expand the scope of available information. The ASC 202 may then instruct the model 210 to perform a subsequent query of the updated graph data structure 208, taking into account both the newly acquired data and the existing context. This process may be repeated iteratively, with the ASC 202 continuing to evaluate the sufficiency of the graph and issuing further queries as needed, until the graph data structure 208 is determined to be adequately populated for instruction set generation.

Through iterative retrieval and supplementation, the ASC 202 may incrementally fill out the computer-generated graph data structure 208 to ensure that it contains desired data elements and relationships relevant to the current operational context. By identifying and addressing gaps in the graph prior to the generation of an instruction set, the ASC 202 may help prevent the omission of key entities, attributes, or linkages that could affect the accuracy or utility of subsequent recommendations or actions. As a result, when the instruction set is ultimately generated, the instruction set may be based on a graph data structure that reflects the most complete and up-to-date view of both internal and external information available to the system.

In various embodiments, the ASC 202 may implement an iterative reasoning loop to autonomously supplement the computer-generated graph data structure 208. Upon receiving an initial output from the model 210, the ASC 202 may identify a data insufficiency or a latent relationship. For example, if the initial output identifies a specific entity name but lacks corresponding organizational metadata, the ASC 202 may generate (e.g., autonomously, periodically, etc.) a supplemental instruction (e.g., search instruction). The instruction may trigger the fenced ingestion gateway 250 to retrieve additional second metadata from the unsecure environment 240 or query the local data repository 220 for specific first metadata. This "ping-pong" type flow allows the ASC 202 to expand the graph data structure in real-time or near real-time, refining the enhanced feature set 218 through one or more passes of the model 210 before an instruction set 211 (e.g., first, intermediate, or final) is generated.

The resulting enhanced feature set 218 may function as a synthesized third metadata, containing attributes that reflect the relationships, impacts, and actionable insights uncovered through analysis of the first metadata and the second metadata. The enhanced feature set 218 may contain risk assessments, opportunity scores, event summaries, or recommended actions that incorporate both the internal state of the system and the influence of recent or ongoing external events. By structuring the enhanced feature set 218 in this manner, the system may provide the ASC 202, the digital assistant 215, and the graphical user interface 221 with contextually relevant and operationally significant guidance.

While the system supports both supervised and unsupervised learning for training the model, the system may select the most appropriate training method based on the type and availability of labeled or unlabeled data. For instance, when sufficient labeled historical data exists, the system may default to supervised learning; otherwise, the system may use semi-supervised or unsupervised techniques to use available data and continuously refine model performance.

f. Illustrative Graphical User Interfaces

The GUI 221 may function as a medium for interaction between the user (e.g., an administrator, technician, or operator) and the digital assistant 215 within the secure environment 201. The GUI 221 may be instantiated as a web dashboard, desktop application, mobile interface, or another suitable equivalent. When the ASC 202 or the digital assistant 215 detects a system-generated event signal 203, the GUI 221 may be updated to present relevant information, actionable prompts, and guidance derived from the instruction set 211. The instruction set 211 may include structured data fields that are initialized with attributes from the enhanced feature set 218, ensuring that the information displayed is both contextually relevant and operationally actionable.

The GUI 221 may display interactive objects 217, e.g., buttons, links, toggles, drop-down menus, or graphical widgets, which enable the user to engage with system recommendations, review summaries, or initiate various executable system resources 230. For example, a summary report section may show a risk assessment sourced from the enhanced feature set 218, while interactive objects 217 may allow the user to schedule a follow-up, request additional data, or initiate an executable system resource 230. The structured data fields within the instruction set 211 may be visually organized into panels, tables, or cards, each representing a specific aspect of the guidance or recommendation produced by the model 210. The GUI 221 may support filtering, sorting, and search functionalities, allowing users to focus on high-priority items or drill down into detailed contextual information.

The GUI 221 may enable the user to provide input data 219 in response to the information presented. Input data 219 may include, without limitation, selections of interactive objects 217, text entries, voice commands, or file uploads. When a user selects an interactive object 217, the GUI 221 may transmit the input data 219 to ASC 202 or the digital assistant 215, triggering the initiation of an executable system resource 230. For example, the user may select a button to isolate a network data instantiation, approve a recommended action, generate additional visualizations based on the enhanced feature set 218, or suitable equivalents. The GUI 221 may also support confirmation dialogs, progress indicators, and real-time feedback to inform the user about the status and outcome of system actions.

In examples where the instruction set 211 includes guidance for the user, the GUI 221 may organize the structured data fields into workflow sections, step-by-step wizards, or collapsible panels. For instance, if the instruction set 211 recommends reviewing a sequence of logged interactions 205 and correlating them with external system events 249, the GUI 221 may guide the user through each step, providing contextual explanations, historical data, and links to supporting information. The enhanced feature set 218 may be visualized using charts, graphs, or heatmaps, enabling users to quickly identify patterns, anomalies, or clusters relevant to the system-generated event signal 203.

The GUI 221 may facilitate cooperation between the digital assistant 215 and the user by supporting natural language queries and conversational interactions. The user may type or speak questions, and the digital assistant 215 may process these queries, retrieve relevant data, and display responses within dedicated sections of the GUI 221. For example, if the user asks about the impact of a recent external alert, the GUI 221 may present a summary card showing the enhanced feature set 218, highlight affected user data structures 204, and suggest actionable next steps. The GUI 221 may also enable users to provide feedback data 213, e.g., rating the usefulness of a recommendation, annotating a report, or requesting clarification.

The GUI 221 may support collaborative workflows, enabling multiple users to access, review, and act on instruction sets 211 concurrently. For example, administrators may annotate shared reports, assign tasks, or escalate issues for further review. The GUI 221 may display activity logs, user comments, and action histories, providing transparency and auditability for operational workflows. Input data 219 submitted by one user may trigger notifications or updates for other users, ensuring coordinated response to evolving scenarios.

To enhance usability and accessibility, the GUI 221 may adapt its layout and content presentation based on device type, user role, or operational context. For example, a technician using a tablet may see a simplified version of the interface with large touch-enabled interactive objects 217, while an administrator on a desktop may access analytics or logged interactions 205 associated with another user. The GUI 221 may also support personalization, allowing users to customize dashboards, set notification preferences, or bookmark frequently accessed reports.

The GUI 221 may be integrated with external authentication systems, notification services, or collaborative platforms, expanding its reach and functionality. When the digital assistant 215 receives a new system-generated event signal 203, the GUI 221 may display proactive alerts, summary reports, and recommended actions, enabling the user to respond rapidly and efficiently. The GUI 221 may also support export of reports, summaries, or action logs for offline review or compliance purposes.

g. Illustrative Executable System Resources

The executable system resource 230 may include various suitable operational processes, functions, or modules that are initiated within the secure environment 201 based at least in part on input received through the GUI 221 or as a result of automated triggers managed by the ASC 202. The executable system resource 230 may be invoked when a user interacts with interactive objects 217, when a system-generated event signal 203 is detected, or when the instruction set 211 specifies an actionable item. The executable system resource 230 may include, without limitation, training procedures for the model 210, processes to isolate or block network data instantiations, and workflows to permit or manage network data instantiations associated with the user data structure 204. Additional operational tasks may also be included as suitable equivalents, depending on organizational requirements and system architecture.

Training 232 may include procedures or algorithms used to update, refine, or retrain the model 210. When the enhanced feature set 218 or feedback data 213 indicates the need for improved accuracy, adaptation to new data types, or response to evolving scenarios, the executable system resource 230 may initiate training 232. Training 232 may include ingesting labeled and unlabeled data from the computer-generated graph data structure 208, processing these inputs through multiple layers of the model 210, and optimizing parameters using techniques e.g., gradient descent, batch normalization, or dropout regularization. The training 232 process may include embedding graph vertices, updating relational weights, and iteratively minimizing loss functions to improve the predictive or analytical capabilities of the model 210. Training 232 may be scheduled as a batch process, triggered by user input, or performed in real time as new data is integrated into the local data repository 220. The results of training 232 may be logged, versioned, and deployed to other instances of ASC 202 or digital assistant 215 to ensure consistency and reliability across distributed environments.

Outputs 234 may include various suitable actions related to control of network data instantiations associated with the user data structure 204. The executable system resource 230 may be responsible for isolating a network data instantiation when risk factors, anomalies, or compliance concerns are identified. For example, if the instruction set 211 recommends isolation due to suspicious or malicious activity detected by the model 210, the executable system resource 230 may sever connections, restrict access, or place the data instantiation into a secure container pending further review. Blocking a network data instantiation may involve denying transmission, terminating sessions, or applying firewall rules to prevent unauthorized or unsafe interactions between the user data structure 204 and external systems. This control may be exercised in response to policy violations, detected threats, or operational safeguards triggered by the ASC 202 or the digital assistant 215.

Permitting a network data instantiation to occur may include validation (e.g., by model 210 or by an administrator) of input data 219, confirmation of compliance with organizational protocols, and authorization based on the instruction set 211. The executable system resource 230 may facilitate normal operations, e.g., allowing scheduled synchronization, approved data transfers, or collaboration between the user data structure 204 and permitted external entities. When a network data instantiation is permitted, the executable system resource 230 may log the activity, monitor ongoing interactions, and provide real-time status updates through the GUI 221. This process may be governed by dynamic rules, contextual analysis, and adaptive thresholds, ensuring operational flexibility while maintaining security and compliance.

The executable system resource 230 may also support additional operational controls, e.g., automated remediation, notification workflows, and escalation procedures. If feedback data 213 or system monitoring indicates the need for corrective action, the executable system resource 230 may initiate processes to cleanse data, notify administrators, or reroute interactions to designated specialists. These controls may be integrated with the audit logs, compliance dashboards, and collaborative features of the GUI 221.

Integration with other system components may enable the executable system resource 230 to adaptively coordinate workflows across the secure environment 201. For example, when the ASC 202 receives a new instruction set 211, the executable system resource 230 may query the local data repository 220, update user data structures 204, or modify event schedules 207 to reflect changes in operational status. The executable system resource 230 may also interact with the fenced ingestion gateway 250 to validate incoming or outgoing data so that all network data instantiations comply with security protocols 252 and are properly tracked within quarantine 258 or as validated data 259.

The design of the executable system resource 230 may be extensible, allowing for the addition of new operational modules and integration with external platforms (e.g., secure cloud-based platforms). Documentation, version control, and audit trails may be maintained for all processes, facilitating compliance, troubleshooting, and optimization of system workflows. User feedback, performance metrics, and operational outcomes may be analyzed to inform ongoing improvement and refinement of executable system resource 230 functionality.

h. Illustrative External System Events Associated with Unsecure Environments

As previously described, external system events 249 may originate from sources outside the secure environment 201, often generated or detected within the unsecure environment 240. The external system events 249 may include changes, alerts, or occurrences in remote data repositories 242, third-party APIs 244, or the internet 246, and may be relevant for contextualizing internal system operations, risk assessment, or decision support. External system events 249 may include, without limitation, environmental alerts, regulatory updates, device status changes, public notifications, or other suitable equivalents. The unsecure environment 240 may host a variety of repositories, e.g., real-time sensor feeds, news aggregators, public databases, or application endpoints, each capable of producing external system events 249 that are transmitted to the secure environment 201 via the fenced ingestion gateway 250.

Remote data repositories 242 may be implemented as cloud-based databases, distributed ledgers, or networked storage systems accessible through the unsecure environment 240. These repositories may maintain records of real-world conditions, operational status reports, or historical logs that are periodically updated or queried by system agents. For example, a remote data repository 242 may provide weather data, regulatory compliance notifications, or market activity reports. External system events 249 generated by remote data repositories 242 may include device malfunction alerts, scheduled maintenance notifications, or policy changes that require immediate attention within the secure environment 201. The ASC 202 or the digital assistant 215 may query these repositories at defined intervals or in response to specific triggers, ensuring that relevant external system events 249 are captured, validated, and integrated into the computer-generated graph data structure 208.

APIs 244 may serve as programmatic gateways to external data sources, enabling the secure environment 201 to retrieve or subscribe to external system events 249 in real time. APIs 244 may expose endpoints for status polling, event subscriptions, or transactional updates, supporting integration with third-party platforms, sensor networks, or collaborative services. For instance, an API 244 may provide device status updates from a remote monitoring service, security alerts from a threat intelligence provider, or operational metrics from a distributed control system. External system events 249 received from APIs 244 may be formatted as JSON payloads, XML documents, or protocol-specific messages, and may include fields e.g., event type, timestamp, severity, and affected resources. The fenced ingestion gateway 250 may intercept these events, apply validation checks, and convert validated data 259 into second metadata for inclusion within the local data repository 220.

The internet 246 may offer an array of sources for external system events 249, ranging from public web pages and news feeds to social media platforms and open sensor networks. System agents may use crawlers 254 to scan the internet 246 for relevant updates, e.g., breaking news articles, public advisories, or real-time data streams. Examples of external system events 249 from the internet 246 may include alerts about environmental hazards, supply chain disruptions, industry developments, or global incidents. For instance, a news aggregator might publish a report about a regional outage, prompting the system to initiate a workflow to assess potential impact. Similarly, a public sensor network may transmit real-time readings about air quality or seismic activity, generating external system events 249 that inform operational decision-making within the secure environment 201.

In various embodiments, when the ASC 202 or the digital assistant 215 receives an external system event 249, the system may evaluate the event's relevance, urgency, and potential impact based on the current state of user data structures 204, logged interactions 205, and event schedules 207. For example, if a remote data repository 242 signals a policy change affecting device operation, the system may cross-reference internal device records and scheduled maintenance to determine necessary actions. If an API 244 reports a security alert, the system may initiate isolation or blocking of network data instantiations associated with affected user data structures 204. The system may also prioritize external system events 249 based on severity, time sensitivity, or alignment with operational.

External system events 249 may be subject to validation and transformation within the fenced ingestion gateway 250. The gateway may assess the authenticity, integrity, and compliance of incoming events, applying security protocols 252, schema validation, and policy checks. Data passing validation may be designated as validated data 259, encapsulated in secure payloads, and transformed into second metadata for integration into the computer-generated graph data structure 208. The transformation process may include extracting relevant fields, standardizing formats, and annotating events with contextual tags that facilitate downstream analysis. Data failing validation may be placed in quarantine 258, pending manual review or remediation.

Integration of external system events 249 into the computer-generated graph data structure 208 may enable the model 210 to uncover latent relationships, dependencies, or cascading effects between internal and external data sources. For example, a sequence of logged interactions 205 may correlate with a series of external alerts, revealing emerging risks or operational opportunities. The enhanced feature set 218 generated by the model 210 may incorporate attributes from external system events 249, providing actionable insights for inclusion in the instruction set 211. The graphical user interface 221 may display summaries of external system events 249, visualizations of impact, and recommended actions, allowing users to review, acknowledge, or initiate workflows.

Feedback data 213 provided by users may influence the handling of external system events 249 e.g., by providing iterative refinement of event processing, prioritization, and response strategies. Users may annotate event records, rate the relevance of external system events 249, or request additional information through the graphical user interface 221. The system may adapt its processing logic, update event schedules 207, or retrain the model 210 based on feedback, ensuring that external system events 249 are managed in alignment with organizational goals and operational requirements.

III. Illustrative Graph Data Structures

FIG. 3 is a simplified diagram of example graph data structure 300 that is generated using data from a local data repository 320 and a remote data repository 340, according to various embodiments. The process of constructing and updating the graph data structure 308-1 and the updated graph data structure 308-2 may begin with the aggregation of data from both the local data repository 320 and the remote data repository 340. The local data repository 320 may provide first metadata, which may include, without limitation, logged interactions, user data structures, event schedules, historical activity logs, or suitable equivalents. The remote data repository 340 may supply second metadata, which may include validated data derived from external system events, public records, remote device status reports, third-party notifications, or other suitable equivalents. The ASC 302 may monitor for system-generated signals 303 that indicate a triggering event, e.g., the arrival of new data, a significant change in system state, the detection of a relevant external system event, or suitable equivalents.

In various embodiments, when constructing the initial graph data structure 308-1, the ASC 302 may process records from the first metadata to generate a first group of graph vertices 353. Each graph vertex in the first group of graph vertices 353 may represent a distinct data entry or entity, e.g., a specific logged interaction, a user profile attribute, or a scheduled event. The ASC 302 may analyze the relationships and dependencies within the first metadata to create a first group of graph data structure linkages 354, which may connect pairs of graph vertices based on shared attributes, temporal proximity, causal relationships, or other criteria. For example, a graph vertex representing a device configuration change may be connected by a graph data structure linkage to a graph vertex representing a subsequent user action, indicating a cause-and-effect sequence. The structure and weighting of these graph data structure linkages may be determined by heuristics, learned association rules, or historical analysis.

Over time, as the system receives new data from the local data repository 320 or the remote data repository 340 or as additional system-generated signals 303 are detected, the ASC 302 may update the graph data structure 308-1 to create an updated graph data structure 308-2. The update process may involve adding a second group of graph vertices 358 to represent new data entries found in the second metadata. For example, when a validated external system event is received (e.g., an environmental alert, a regulatory update, or a remote device notification) the ASC 302 may generate corresponding graph vertices labeled A, B, C, D, and E. Each newly added graph vertex may be annotated with attributes relevant to the external data source, event type, or timestamp. The ASC 302 may then establish new graph data structure linkages 358 between the first group of graph vertices 353 and the second group of graph vertices 358, reflecting the relationships or dependencies that have been uncovered as a result of the new external information.

The ASC 302 may use a combination of rule-based logic, statistical association mining, or machine learning algorithms (e.g., model 210 with respect to FIG. 2) to determine when to create a new vertex, when to merge existing vertices, or when to establish or update a graph data structure linkage. For example, if a new external system event is semantically or temporally aligned with a previously recorded internal event, the ASC 302 may create a graph data structure linkage between the corresponding vertices. The system may also assign weights to graph data structure linkages to reflect the strength, recency, or reliability of the relationship. These weights may be updated over time based on feedback data (e.g., feedback data 213 with respect to FIG. 2), additional evidence, instruction sets, or suitable equivalents.

In some embodiments, the model 210 may perform disambiguation (e.g., entity disambiguation) to resolve identities across disparate data sources. The system may generate an "entity signature" for a vertex by synthesizing attributes from the first metadata (e.g., transaction frequency, geographic location, or interaction timestamps) and comparing them against high-confidence validation signatures derived from the second metadata (e.g., verified business registries or public filings). The model 210 may calculate a confidence score for a proposed linkage between an unverified internal vertex and a validated external vertex. If the confidence score exceeds a defined threshold, the ASC 202 may merge the vertices or establish a high-weight linkage; if the score is below the threshold, the system may treat the entries as distinct entities to prevent the collision of data for entities with similar naming conventions.

The graph data structure 308 may be continuously updated as new data arrives (e.g., external system events 249 with respect to FIG. 2) or as system conditions evolve (e.g., new data occurs within the secure environment 201 with respect to FIG. 2). The ASC 302 may implement incremental update mechanisms, where only the affected portions of the graph data structure are recalculated or extended. For example, when a new external system event is received and/or a logged interaction occurs (e.g., logged interaction 205 with respect to FIG. 2), the ASC 302 may add a single graph vertex and a small number of new graph data structure linkages (e.g., within three orders), without a complete reconstruction of the entire graph data structure.

The update process for the computer-generated graph data structure 308 may further include the recursive generation of N-order graph vertices. When a second group of graph vertices 358 is established representing an external entity (e.g., a "first-order" supplier), the ASC 302 may utilize the model 210 to identify further associations associated with that external entity. The system may then generate a third group of graph vertices representing entities or events that have no direct record within the first metadata of the local data repository 320. By establishing linkages between vertices within the second metadata and these third-party vertices, the system constructs a multi-tier representation of relationships (e.g., a supplier's supplier). This N-order traversal enables the model 210 to perform impact analysis for cascading events that originate several degrees of separation away from the primary user data structure.

In examples where only a subset of the graph is updated (e.g., when a particular user data structure is modified or when only a specific external system event is relevant) the ASC 302 may selectively update the relevant graph vertices and graph data structure linkages. The ASC 302 may use indexing, subgraph extraction, or caching strategies to efficiently manage updates, avoid redundant computations, and maintain the integrity of the graph data structure 308. Additionally, the system may support periodic batch updates, where accumulated changes are applied during scheduled maintenance windows to optimize resource utilization and ensure consistency.

The ASC 302 may implement a variety of resource-efficient strategies to manage the memory and processing power footprint associated with maintaining and updating the graph data structure 308. Various embodiments may involve the use of indexing structures, e.g., hash tables or balanced trees, to locate and access graph vertices or graph data structure linkages relevant to a particular update or query. For example, if a new external system event affects only a specific subset of user data structures, the ASC 302 may use an index to directly retrieve the impacted vertices and apply updates locally, rather than traversing the entire graph data structure. Such selective indexing may significantly reduce both the memory footprint and computational overhead, especially as the number of graph vertices and linkages grows over time.

Subgraph extraction may further enhance efficiency by allowing the ASC 302 to isolate and operate on only the relevant portion of the graph data structure 308. For instance, when the system-generated event signal 303 pertains to a single operational domain or user segment, the ASC 302 may extract a subgraph containing only the first group of graph vertices 353 and the second group of graph vertices 358 that are impacted by the event. Some or all analysis, feature extraction, and linkage updates may be performed on this subgraph, minimizing resource consumption. Once updates are complete, the updated subgraph may be merged back into the graph data structure 308.

Caching strategies may also be employed to reduce redundant computation and minimize repeated access to frequently used data. The ASC 302 may maintain a cache of recently accessed or updated graph vertices, graph data structure linkages, or enhanced feature sets. For example, if certain relationships are repeatedly queried by the model 210 or by user interactions through the graphical user interface 221, the ASC 302 may store the results in a local cache with a defined time-to-live or update policy. This may allow the system to quickly serve repeated requests without reprocessing the entire graph data structure, reducing both latency and processing load. The cache may be invalidated or refreshed when new data arrives or when batch updates are applied, ensuring that results remain consistent with the current state of the system.

To further manage computational costs, the ASC 302 may implement periodic batch updates, where changes accumulated during a defined interval are applied together during off-peak hours or scheduled maintenance windows. During these windows, the system may perform housekeeping tasks e.g., garbage collection, compaction of graph data structure linkages, and recalculation of derived features. For example, if dozens of external system events are received over a day, the ASC 302 may queue the corresponding graph vertex additions and linkage updates, applying them in bulk to minimize write operations and avoid contention. This strategy may help balance responsiveness with resource utilization, particularly in high-throughput environments or when operating under hardware constraints.

Other suitable equivalents may include pruning of obsolete or low-significance graph vertices and linkages, adjustment of graph resolution (e.g., aggregating related events into summary nodes), and the use of streaming algorithms that process data incrementally as it arrives, without retaining an entire history in memory. By combining these techniques, the ASC 302 may maintain an up-to-date and actionable graph data structure 308 while minimizing the impact on system resources, ensuring that the system remains scalable, efficient, and responsive to both routine operations and exceptional events.

As the graph data structure 308 changes, the ASC 302 may use the updated structure to generate new instruction sets that include structured data fields initialized with an enhanced feature set 318. The enhanced feature set 318 may synthesize information about newly discovered relationships between the first group of graph vertices 353 and the second group of graph vertices 358, providing actionable insights, risk assessments, recommended actions, or suitable equivalents. The process of updating the graph data structure and generating instruction sets may be iterative, with each cycle informed by ongoing data collection, user feedback, and system outcomes.

The system may also support rollback and versioning of the graph data structure 308, allowing the ASC 302 or authorized users to review historical states, audit changes, and recover from errors or inconsistencies. The combination of continuous and selective updates, dynamic vertex and linkage generation, and integration of internal (e.g., first metadata) and external data (e.g., second metadata) enables the graph data structure 308 to serve as a living representation of the current operational context, supporting analysis, response generation, and informed decision-making within the secure environment 201.

The graph data structures depicted and described, including but not limited to the graph data structure 308-1, the updated graph data structure 308-2, and any other graph representations, are provided solely by way of example and are not intended to limit the scope or form of possible graph implementations within the system. Any graph data structure may be instantiated in a variety of forms, including, without limitation, directed graphs, undirected graphs, weighted graphs, hypergraphs, multi-graphs, trees, adjacency lists, adjacency matrices, property graphs, or any other suitable equivalents. The graph vertices may represent any type of data entity, attribute, event, or object, and the graph data structure linkages may encode any form of relationship, dependency, association, similarity, or interaction, whether explicit or inferred. The graph data structures may include, without limitation, internal metadata, external metadata, enhanced feature sets, historical records, user feedback, or operational annotations, and may be configured to support updates, partitioning, hierarchical organization, or distributed processing. The structure, content, size, and semantics of the graph data structures may be adapted according to system requirements, data types, application logic, or integration with other analytical models or storage systems. All modifications, extensions, and equivalents that conform to the underlying principles of representing, updating, and querying relationships among data entities are contemplated and fall within the spirit and scope of this disclosure.

In various embodiments, graph data structure linkages 354 (or graph data structure linkages 358) may be assigned weights or prioritization values to reflect the strength, recency, or reliability of the relationships between vertices. These weights can be determined based on factors such as temporal proximity, frequency of interaction, semantic similarity, or confidence scores derived from validation processes. By incorporating weighted linkages, the system can prioritize more significant or recent relationships during graph analysis, enabling the model to focus on the most relevant connections when generating enhanced feature sets and instruction sets. This facilitates more accurate and context-aware downstream actions.

IV. Illustrative Graphical User Interface

Figure 4:
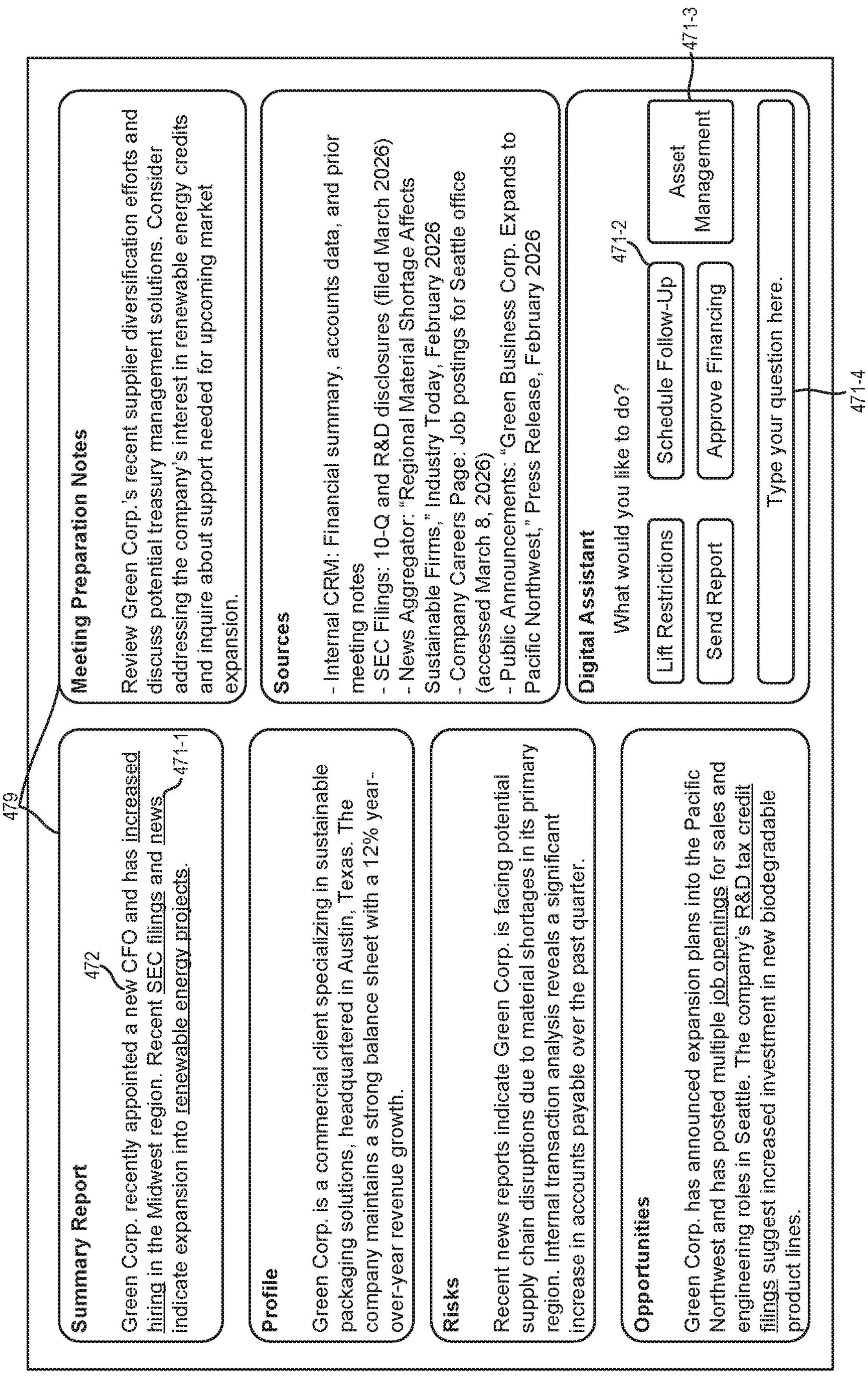
FIG. 4 is a simplified diagram of example graphical user interface for displaying interactive objects associated with an instruction set and for initializing an executable system resource, according to various embodiments.

FIG. 4 is a simplified diagram of example graphical user interface 400 for displaying interactive objects associated with an instruction set and for initializing an executable system resource, according to various embodiments. The GUI 400 may be an interactive dashboard presented to an administrator for the purpose of guiding a user (e.g., a client) through various operational options and facilitating actionable decision-making. The GUI 400 may be rendered as a web application, a desktop portal, or a mobile interface, and may adapt its layout and content presentation according to device type, available screen resolution, and user preferences. When an instruction set 479 is generated (e.g., a summary report, profile summary, or risk analysis) the GUI 400 may display these instruction sets 479 as visually distinct sections or panels, each containing structured data fields 471 that are initialized with attributes from the enhanced feature set. The enhanced feature set may synthesize information from both the first metadata (e.g., internal records e.g., account history, meeting notes, transaction logs) and the second metadata (e.g., external events e.g., regulatory filings, news alerts, market shifts, or public notifications).

Each instruction set 479 displayed on the GUI 400 may be customized to an operational context signaled by the system-generated event, the needs of the administrator, user, or any suitable equivalent. For example, a summary report instruction set (e.g., an instruction set 211 with respect to FIG. 2) may present a narrative overview of recent developments, e.g., executive appointments, expansion activity, or significant account changes, with structured data fields 471 underlined or otherwise highlighted to indicate that they are generated from the enhanced feature set. A risk summary instruction set may detail potential concerns, e.g., supply chain disruptions, regulatory inquiries, abnormal transaction patterns, or suitable equivalents, again with structured data fields 471 that are directly linked to relevant internal and external data sources. A profile summary instruction set may include details about the client's organizational structure, account status, or recent interactions, with interactive fields that allow for further exploration.

Structured data fields 471 within each instruction set 479 may be rendered as interactive objects (e.g., underlined hyperlinks, expandable cards, toggles, or dropdowns) that allow the administrator to retrieve supporting documentation, cross-reference source data, or trigger system actions. For instance, clicking on an underlined structured data field in the summary report may open a modal window displaying the relevant SEC filing, news article, or internal meeting note from which the insight was derived. In the risk summary, selecting a structured data field 471 may link to real-time dashboards, historical trend charts, or detailed audit logs. These interactive objects may be context-sensitive, adapting their available options and displayed content according to the type of data and the permissions of the current user.

The GUI 400 may also support complex operational controls via structured data fields 471. For example, interaction with an asset management structured data field 471-3 may present the administrator with options to isolate, block, or permit financial transactions, initiate account holds, or escalate cases for compliance review. These controls may be presented as buttons, radio selections, or confirmation dialogs that, when activated, transmit input data to the ASC 202 or to an executable system resource for immediate action. The system may display confirmation messages, status indicators, or progress bars to provide real-time feedback to the administrator regarding the outcome of the selected action.

To accommodate a variety of device types and user environments, the GUI 400 may be responsive to the size and parameters of the display device. When rendered on a large desktop monitor, the GUI 400 may present all instruction sets 479 and structured data fields 471 in parallel, using columns, grids, or tabbed sections for comprehensive situational awareness. On a tablet or mobile device, the graphical user interface 400 may collapse instruction sets into expandable accordions or stack them vertically for easy scrolling. The system may automatically adjust font sizes, button dimensions, and spacing to maintain usability and accessibility standards across platforms. Users may be able to customize which instruction sets 479 are displayed by default, pin high-priority panels, or filter structured data fields 471 by relevance or risk level.

The process by which the enhanced feature set is selected and displayed on the graphical user interface 400 may involve contextual filtering and prioritization. The ASC 202 and the digital assistant 215 may analyze the current operational scenario, user preferences, and the nature of the system-generated event signal to determine which attributes from the enhanced feature set are most relevant. For example, in the event of a market disruption, the GUI 400 may prioritize the display of risk-related structured data fields, while in routine operational reviews, client relationship summaries and opportunity indicators may be foregrounded. The presentation logic may also consider historical user interactions, recent feedback, explicit user queries, or suitable equivalents, received through the GUI 400 or the digital assistant 215.

Interactive engagement with structured data fields 471 may be designed to support both exploratory analysis and guided workflows. When an administrator clicks, taps, or otherwise selects an interactive object, the GUI 400 may trigger asynchronous data retrieval, fetch supporting documents, or launch embedded visualization tools without requiring the user to navigate away from the main dashboard. For example, selecting a structured data field that references new hiring activity may display a timeline of recent job postings, links to public company announcements, and a summary of the potential impact on the user's accounts. For compliance tasks, interaction with structured data fields 471 may present checklists, approval workflows, or escalation options, streamlining the process of responding to regulatory or operational triggers.

The GUI 400 may also facilitate collaborative review and feedback. Multiple administrators or users may access the same dashboard, annotate structured data fields, assign follow-up tasks, or record observations directly within the interface. All interactions may be logged, with user identities, timestamps, and action details captured for auditability and historical analysis. If feedback data 213 is provided (e.g., if a user rates the usefulness of a recommendation or flags a structured data field as unclear) this feedback may be used to refine the display logic, enhance future instruction sets, or trigger retraining of the underlying model 210.

In addition to direct interaction, the GUI 400 may support export and reporting capabilities. Administrators may generate PDF summaries, CSV exports, or print-friendly versions of the instruction sets 479, including both the structured data fields 471 and the underlying source links. The system may allow for archiving of completed reviews, tracking of outstanding actions, and notification of users when new instruction sets are available or when urgent issues are detected.

The GUI 400 as depicted and described is provided solely for illustrative purposes and is not intended to limit the scope of possible user interface configurations, presentation logic, or interaction models. The GUI 400 may be instantiated in a variety of forms, including, without limitation, web-based dashboards, desktop applications, mobile interfaces, voice-driven assistants, or any other suitable equivalents. The arrangement, appearance, and behavior of instruction sets 479, structured data fields 471, interactive objects, panels, and visualization tools may be adapted according to organizational preferences, user roles, system parameters, device capabilities, accessibility needs, and evolving technological standards. The content and structure of the instruction sets 479, as well as the methods for displaying or interacting with structured data fields 471, may be modified, expanded, or reconfigured to accommodate alternative workflows, data types, business logic, or integration with external systems. The GUI 400 may support additional or alternative features, e.g., custom theming, localization, adaptive layouts, plugin architectures, multi-user collaboration, or integration with third-party platforms, without departing from the underlying principles described herein. Accordingly, the GUI 400 should be understood as one example among many possible implementations, and all modifications, equivalents, and alternatives that fall within the spirit and scope of the disclosure are contemplated.

V. Illustrative Architectures

Figure 5:
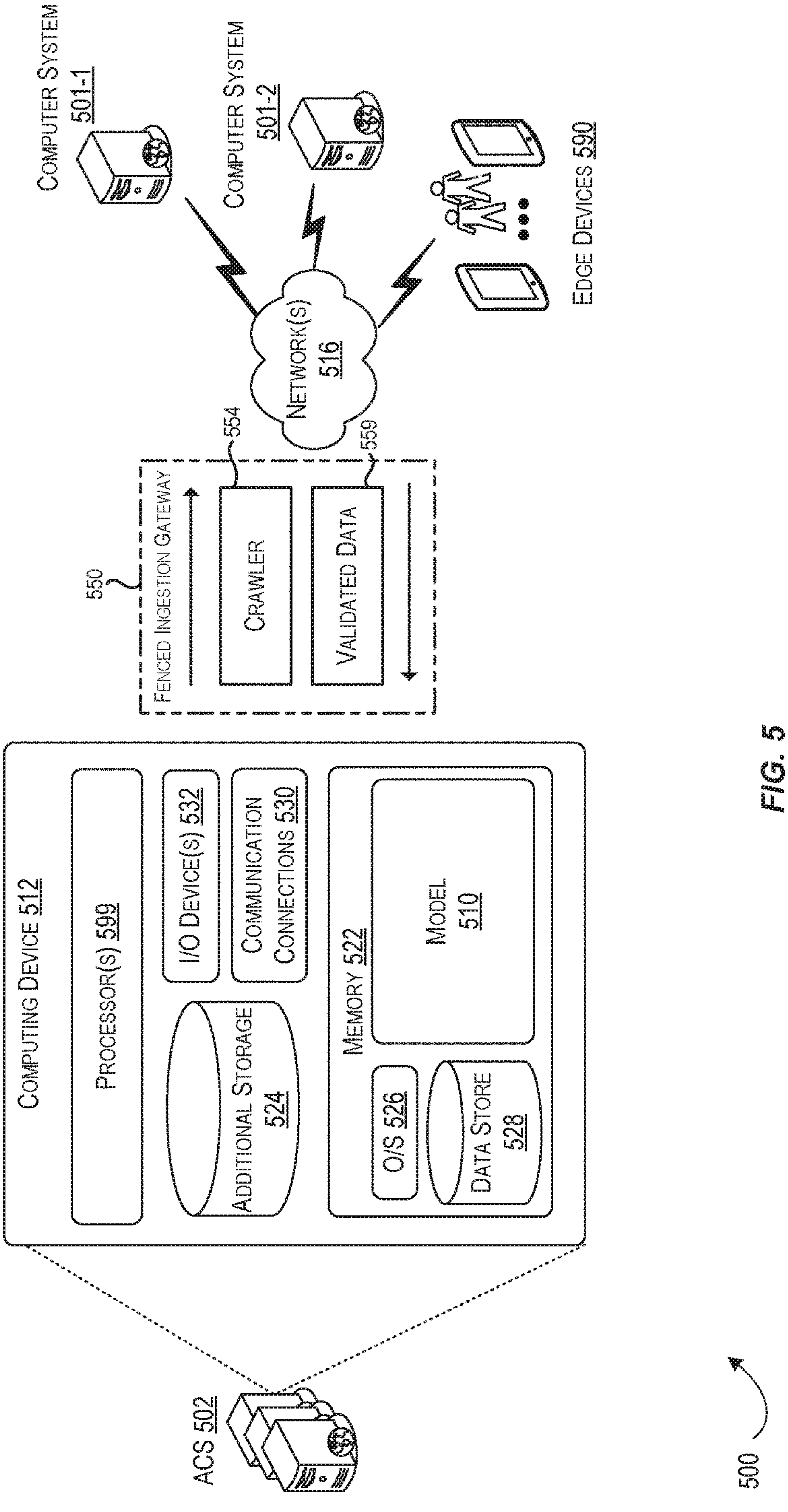
FIG. 5 is a simplified diagram of example network of computer systems for generating an instruction set and initializing an executable system resource, according to various embodiments.

FIG. 5 is a simplified diagram of example network of computer systems 500 for generating an instruction set and initializing an executable system resource, according to various embodiments. An ASC 502 may be instantiated on a computing device 512, which may be any suitable computing platform, including without limitation, a physical server, a cloud-based virtual machine, a desktop workstation, a laptop, an embedded controller, or any suitable equivalent. A computing device 512 may incorporate one or more processors 599, which may include central processing units, graphics processing units, tensor processing units, digital signal processors, application-specific integrated circuits, field-programmable gate arrays, or any other suitable equivalents. These processors may execute instructions that control the workflows of the ASC 502, manage data retrieval and storage, and coordinate communication with other system components.

A memory 522 may be present within the computing device 512, and may include volatile memory e.g., random access memory, non-volatile memory e.g., flash memory or read-only memory, and hierarchical storage e.g., memory caches or persistent storage buffers. The memory 522 may store executable instructions, operating system components (e.g., an O/S 526), configuration files, temporary data, and log files. Of particular importance, the memory 522 may store a data store 528, which may function as the local data repository described in earlier figures, and a model 510, which may be the instance of the machine learning or analytical model responsible for querying graph data structures and generating enhanced feature sets. The data store 528 may contain, without limitation, user data structures, logged interactions, event schedules, and computer-generated graph data structures, while supporting transactional integrity and concurrent access.

The computing device 512 may further include I/O devices 532, which may encompass a variety of input and output mechanisms. Input devices may include keyboards, keypads, touchscreens, trackpads, pointing devices, microphones, cameras, barcode readers, or biometric sensors. Output devices may comprise displays, printers, speakers, haptic feedback actuators, or indicator lights. These I/O devices may support both direct human interaction and automated machine-to-machine communication. Communication connections 530 may provide physical or logical interfaces for networking, supporting standards and protocols e.g., Ethernet, Wi-Fi, Bluetooth, Zigbee, cellular networks (3G, 4G, 5G, or later), serial communication (RS-232, USB), fiber optic links, or proprietary industrial protocols. These connections may enable the ASC 502 to interact with other devices, gateways, and remote systems.

Additional storage 524 may be included to supplement the memory 522, providing capacity for archival, backup, or high-volume data retention. The additional storage 524 may comprise hard disk drives, solid-state drives, optical media, tape drives, network-attached storage, or cloud object storage. This storage may be used for long-term retention of log files, historical data, model checkpoints, or regulatory compliance archives. The system may support scheduled backups, incremental snapshots, redundancy, and failover mechanisms to ensure data durability and availability.

The fenced ingestion gateway 550 may act as an intermediary between the secure environment of the ASC 502 and external data sources. The fenced ingestion gateway 550 may be implemented as a dedicated hardware appliance, a secure enclave within a cloud platform, a virtualized network function, or a software-defined gateway deployed on a general-purpose server. The fenced ingestion gateway 550 may enforce security protocols, perform data validation, and manage the flow of information from external sources to the secure environment. Within the gateway, a crawler 554 may operate as a software agent or hardware-accelerated process that systematically retrieves, indexes, and preprocesses data from external system events. The crawler 554 may access data from network 516, which may be any form of communication network including local area networks, wide area networks, public internet, private intranets, virtual private networks, peer-to-peer networks, mesh networks, or combinations thereof.

Computer systems 501 and edge devices 590 may function as sources of external system events, remote data repositories, or endpoints for data ingestion. The computer systems 501 may represent cloud servers, enterprise databases, regulatory platforms, or partner systems that offer APIs, data feeds, or file transfer services. Edge devices 590 may include IoT sensors, actuators, remote monitoring units, smart appliances, mobile devices, or industrial controllers deployed at the perimeter of the network or within field environments. The crawler 554 may access these devices using secure application programming interfaces, message queues, publish-subscribe frameworks, RESTful endpoints, or custom data exchange protocols. Data retrieved by the crawler 554 may be subject to schema validation, malware scanning, digital signature checks, and policy enforcement before being transmitted to the fenced ingestion gateway 550 for further processing.

The overall architecture may support a range of deployment models, including centralized, distributed, federated, and hybrid environments. The ASC 502, fenced ingestion gateway 550, and associated components may be co-located on a single server for smaller installations or distributed across multiple cloud regions, data centers, or edge locations for large-scale or mission deployments. Secure communication may be maintained using encrypted tunnels, digital certificates, and authentication tokens to protect data in transit. Multi-tenant isolation, role-based access control, and virtual network segmentation may be used to ensure that data and workflows are appropriately separated according to organizational, regulatory, or operational preferences.

Data flow within the network of computer systems 500 may be coordinated using a variety of software mechanisms. Direct remote procedure calls, REST APIs, or gRPC endpoints may facilitate synchronous and asynchronous communication between modules. Batch processing frameworks may coordinate the periodic transfer, transformation, and archiving of large data sets.

The model 510 may be trained and executed locally within the memory 522 of the computing device 512, or may be distributed for training and inference across additional storage 524, edge devices 590, or remote computing platforms. Model updates, instruction set generation, and integration of feedback data 213 may be synchronized across the network of computer systems 500 to ensure consistent operation and adaptation to changing conditions. Logging, audit trails, and monitoring interfaces may provide visibility into system status, performance, and compliance with operational policies.

Each component within the network of computer systems 500 (e.g., including processors, memory, I/O devices, communication connections, storage, crawlers, gateways, networks, computer systems, and edge devices) may be instantiated using any combination of hardware, software, firmware, or cloud-based resources. Components may be updated, replaced, reconfigured, or extended as technology evolves or as organizational needs change. The architecture is intended to be flexible and adaptable, accommodating a broad range of deployment scenarios, data types, integration requirements, and performance objectives. All modifications, variations, and equivalents that align with the principles of secure data ingestion, analysis, workflow coordination, and system resource management described herein are contemplated and fall within the scope of this disclosure.

Various embodiments that utilize at least one network that would be familiar to those skilled in the art for supporting communications using any of a variety of commercially available protocols, e.g., Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, an area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may also be capable of executing programs or scripts in response to requests from user devices, e.g., by executing one or more Web applications that may be implemented as one or more scripts or programs written in any programming language, e.g., Java®, C, C#, or C++, or any scripting language, e.g., Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, e.g., on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, e.g., disk drives, optical storage devices, and solid-state storage devices e.g., random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also typically include a number of software applications, modules, services, or other elements located within at least one working memory device, including an operating system and application programs, e.g., a client application or Web browser. It should be appreciated that alternate embodiments may have numerous variations from that described above. For example, customized hardware might also be used and/or particular elements might be implemented in hardware, software (including portable software, e.g., applets), or both. Further, connection to other computing devices e.g., network input/output devices may be employed.

Storage media and computer readable media for containing code, or portions of code, can include any appropriate media known or used in the art, including storage media and communication media, e.g., but not limited to volatile and non-volatile storage, removable and non-removable media implemented in any method or technology for storage and/or transmission of information e.g., computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

VI. Illustrative Methods

Figure 6:
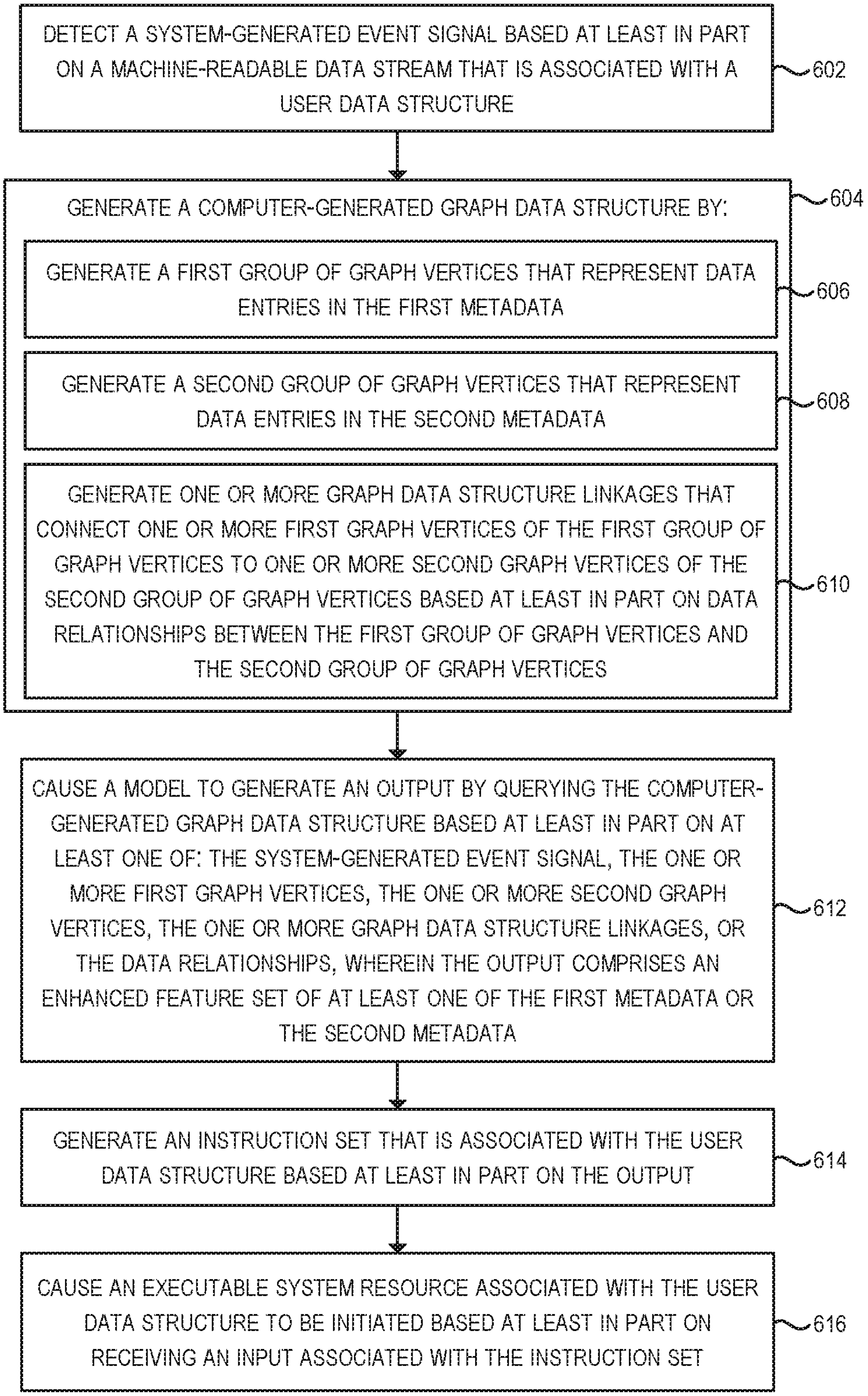
FIG. 6 is a simplified diagram of an example method for generating an instruction set and initializing an executable system resource, according to various embodiments.

FIG. 6 is a simplified diagram of an example method for generating an instruction set and initializing an executable system resource, according to various embodiments. This method, as well as any other methods detailed throughout this disclosure, may be represented as a logical flow diagram in which each operation corresponds to a sequence of actions that may be realized in hardware, through computer instructions, or as a combination of both. When implemented as computer instructions, these operations may be encoded as computer-executable instructions stored on one or more non-transitory computer-readable storage media. When executed by one or more processors, these instructions may carry out the described operations. Computer-executable instructions may encompass, without limitation, routines, programs, objects, components, or data structures that implement designated functions or manage specific data types. The sequence in which these operations are described should not be interpreted as restrictive, and any subset of the outlined operations may be performed in various sequences and/or concurrently to achieve the described process. Furthermore, some, any, or all of the methods described herein may be executed under the direction of one or more computer systems that are programmed with particular executable instructions. Implementation may occur as code (e.g., executable instructions, computer programs, or applications) executing on one or more processors, as hardware, or as combinations of hardware and software. As previously discussed, code may reside on a non-transitory computer-readable storage medium, for example, in the form of computer instructions designed to perform the described processes.

At block 602, the method 600 may include the step of detecting a system-generated event signal based at least in part on a machine-readable data stream that is associated with a user data structure. The step may be performed by a computer system. By way of a non-limiting example, the machine-readable data stream may be generated using first metadata that is associated with logged interactions of the user data structure, where the first metadata is stored on a local data repository (e.g., local data repository 220 with respect to FIG. 2), and second metadata associated with an external system event that is stored on a remote data repository (e.g., remote data repository 242 with respect to FIG. 2). The second metadata may be generated independently of the logged interactions or the user data structure. When an external system event is detected, a secure environment that contains the local data repository may initiate a fenced ingestion gateway (e.g., fenced ingestion gateway 250 with respect to FIG. 2) to retrieve the external system event from the remote data repository. The fenced ingestion gateway may perform a validation check on unverified data associated with the external system event, using one or more security protocols. If the unverified data passes the validation check, the fenced ingestion gateway may convert the unverified data into the second metadata, transmit the second metadata in a secure payload to the secure environment, and allow it to be processed further. If the data fails validation, the gateway may quarantine the unverified data to prevent its entry into the secure environment. For example, if a public news feed reports a significant regulatory change, the fenced ingestion gateway may first confirm the authenticity and integrity of the feed before permitting the information to be integrated and associated with the relevant user data structure.

At block 604, the method 600 may include the step of generating a computer-generated graph data structure by blocks 606-610. The step may be performed by a computer system. By way of a non-limiting example, the computer-generated graph data structure (e.g., graph data structure 308-1 with respect to FIG. 3) may be assembled by the ASC based on the newly available first metadata and second metadata, supporting the organization and correlation of internal and external data entities. The graph data structure may be constructed from scratch or may build upon a previously existing graph.

At block 606, the method 600 may include the step of generating a first group of graph vertices that represent data entries in the first metadata. The step may be performed by a computer system. By way of a non-limiting example, the ASC (e.g., ASC 302 with respect to FIG. 3) may create graph vertices for each relevant entry in the first metadata, e.g., individual logged interactions, user attributes, or scheduled events (e.g., first group of graph vertices 353 in FIG. 3). Each graph vertex may be annotated with unique identifiers, timestamps, and data attributes reflecting the nature of the internal data it represents. For example, a graph vertex may represent a specific maintenance activity logged for a user device.

At block 608, the method 600 may include the step of generating a second group of graph vertices that represent data entries in the second metadata. By way of a non-limiting example, the ASC may generate additional graph vertices (e.g., second group of graph vertices 358 in FIG. 3) for each new entry in the second metadata, e.g., validated external alerts, news updates, or remote device status changes. The new graph vertices may be assigned unique identifiers and may be linked to information e.g., the event source, event type, and time of occurrence. For example, if an external system event indicates a regulatory filing, a vertex may be created to represent that filing, capturing relevant metadata.

At block 610, the method 600 may include the step of generating one or more graph data structure linkages that connect one or more first graph vertices of the first group of graph vertices to one or more second graph vertices of the second group of graph vertices based at least in part on data relationships between the first group of graph vertices and the second group of graph vertices. The step may be performed by a computer system. By way of a non-limiting example, the ASC may analyze the attributes, temporal proximity, or semantic similarity between internal and external graph vertices and generate graph data structure linkages (e.g., graph data structure linkages 358 in FIG. 3) that connect, for example, a user-logged maintenance event to a recent external system event reporting a regional disruption. These linkages may encode the strength, directionality, or type of relationship discovered between the two sets of metadata, allowing the model to later uncover latent dependencies or cascades.

At block 612, the method 600 may include the step of causing a model to generate an output by querying the computer-generated graph data structure based at least in part on at least one of: the system-generated event signal, the one or more first graph vertices, the one or more second graph vertices, the one or more graph data structure linkages, or the data relationships, wherein the output comprises an enhanced feature set of at least one of the first metadata or the second metadata. The step may be performed by a computer system. By way of a non-limiting example, the model (e.g., model 510 with respect to FIG. 5) may be a machine learning model that is trained using at least one of the computer-generated graph data structure or the second metadata as unlabeled training data, and the first metadata as labeled data. The model may be updated iteratively using feedback data (e.g., feedback data 213 with respect to FIG. 2), and may be deployed for use by a digital assistant (e.g., digital assistant 215 with respect to FIG. 2). The model may retrieve an existing computer-generated graph data structure, add the second group of graph vertices to it, and generate an updated graph data structure (e.g., updated graph data structure 308-2 in FIG. 3) based on new instruction sets or feedback data. For example, the model may discover that an external alert has a strong correlation with a recent change in a user's account status, and may generate an enhanced feature set.

At block 614, the method 600 may include the step of generating an instruction set that is associated with the user data structure based at least in part on the output. The step may be performed by a computer system. By way of a non-limiting example, the instruction set may include one or more structured data fields that are initialized with the enhanced feature set (e.g., instruction set 211 with respect to FIG. 2 and instruction set 479 with respect to FIG. 4). The ASC may cause a digital assistant (e.g., digital assistant 215 with respect to FIG. 2) to access the instruction set and generate a graphical user interface (e.g., GUI 400 with respect to FIG. 4) that displays, for at least one of the structured data fields, an interactive object representing the enhanced feature set. An input may be received through interaction with the interactive object, e.g., a button click or selection, which may trigger further system actions. For example, a structured data field may display an actionable risk score or a recommended follow-up for an administrator to review with a user.

At block 616, the method 600 may include the step of causing an executable system resource associated with the user data structure to be initiated based at least in part on receiving an input associated with the instruction set. The step may be performed by a computer system. By way of a non-limiting example, initializing the executable system resource (e.g., executable system resource 230 with respect to FIG. 2) may include causing at least one of the following: isolating a network data instantiation associated with the user data structure, blocking the network data instantiation associated with the user data structure, or permitting the network data instantiation to occur that is associated with the user data structure. For example, if the administrator accepts a recommendation from the instruction set displayed on the graphical user interface (e.g., GUI 400 with respect to FIG. 4), the system may automatically isolate a suspicious transaction, block a network connection, or allow a scheduled update to proceed, ensuring that operational actions are precisely aligned with data-driven insights.

VII. Illustrative Examples

In a non-limiting example, in a commercial banking environment, a relationship manager is scheduled to meet with a corporate client. The system detects a scheduled meeting event in the internal calendar records (e.g., event schedules 207 with respect to FIG. 2) and retrieves the relevant user data structure (e.g., user data structure 204 with respect to FIG. 2) from the local data repository (e.g., local data repository 220 with respect to FIG. 2). Simultaneously, the system ingests external data e.g., recent SEC filings, news articles mentioning the client, and job postings indicative of business expansion, using the fenced ingestion gateway (e.g., fenced ingestion gateway 250 with respect to FIG. 2) to validate and sanitize these inputs. The system generates a graph data structure (e.g., computer-generated graph data structure 208 with respect to FIG. 2) linking the meeting schedule, historical transaction activity, and the external signals. A model (e.g., model 210 with respect to FIG. 2) queries the graph to identify patterns, e.g., leadership changes or hiring events, which may present new risks or opportunities. The system generates an instruction set (e.g., instruction set 211 with respect to FIG. 2) that summarizes the findings, highlights actionable intelligence, and delivers a briefing to the relationship manager through a graphical user interface (e.g., GUI 221 with respect to FIG. 2). Upon review, the manager may trigger an executable system resource (e.g., executable system resource 230 with respect to FIG. 2) to initiate follow-up workflows, e.g., scheduling an additional meeting, sending targeted communications, or updating client risk ratings.

In a non-limiting example, a financial institution wishes to monitor its loan portfolio for emerging risks associated with external market events. The system continuously monitors internal loan performance logs (e.g., logged interactions 205 with respect to FIG. 2) and correlates these with validated external data streams, including macroeconomic indicators, regulatory alerts, and news reports on relevant industries, received via the fenced ingestion gateway (e.g., fenced ingestion gateway 250 with respect to FIG. 2). As new external events occur, e.g., a significant change in interest rates or the announcement of sector-wide regulatory reforms, the system updates the graph data structure (e.g., computer-generated graph data structure 208 with respect to FIG. 2) to reflect these changes and their relationships to specific borrowers or asset classes (e.g., user data structures 204 with respect to FIG. 2). The model (e.g., model 210 with respect to FIG. 2) analyzes the integrated data to generate an enhanced feature set (e.g., enhanced feature set 218 with respect to FIG. 2) including exposure metrics, risk assessments, and recommended actions. The instruction set (e.g., instruction set 211 with respect to FIG. 2) is delivered to risk management personnel through the GUI (e.g., GUI 221 with respect to FIG. 2), enabling review and response. If a risk threshold is breached, the user may trigger an executable system resource (e.g., executable system resource 230 with respect to FIG. 2) to freeze credit lines, adjust loan covenants, or initiate escalation procedures.

In a non-limiting example, a retail banking operation employs the system to detect and respond to potentially fraudulent transactions. The system logs internal transaction events, user authentication attempts, and device fingerprints as logged interactions (e.g., logged interactions 205 with respect to FIG. 2). Concurrently, it ingests external threat intelligence feeds and public alerts about known fraud campaigns through the fenced ingestion gateway (e.g., fenced ingestion gateway 250 with respect to FIG. 2). When an anomalous transaction is detected, the system generates a graph data structure (e.g., computer-generated graph data structure 208 with respect to FIG. 2) linking the transaction, the user's historical behavior (e.g., user data structure 204 with respect to FIG. 2), and recent external alerts. The model (e.g., model 210 with respect to FIG. 2) queries this graph to evaluate the likelihood of fraud, synthesizing evidence from both internal and external sources. An instruction set (e.g., instruction set 211 with respect to FIG. 2) is generated that includes a risk score, recommended actions, and supporting evidence, presented to a fraud analyst via the GUI (e.g., GUI 221 with respect to FIG. 2). The analyst may interact with the instruction set to initiate an executable system resource (e.g., executable system resource 230 with respect to FIG. 2), e.g., blocking the transaction, notifying the customer, or escalating the incident for further investigation.

In a non-limiting example, a multinational bank uses the system to automate compliance monitoring for cross-border payments. The system captures payment initiation events, user roles, and transaction metadata as logged interactions (e.g., logged interactions 205 with respect to FIG. 2) from the local data repository (e.g., local data repository 220 with respect to FIG. 2). At the same time, it ingests and validates external regulatory updates, sanctions lists, and geopolitical risk assessments through the fenced ingestion gateway (e.g., fenced ingestion gateway 250 with respect to FIG. 2). The graph data structure (e.g., computer-generated graph data structure 208 with respect to FIG. 2) connects internal payment events with relevant external regulations and risk indicators. The model (e.g., model 210 with respect to FIG. 2) queries the graph to identify potential compliance issues, e.g., payments to newly sanctioned entities or transactions exceeding jurisdictional thresholds. The system generates an instruction set (e.g., instruction set 211 with respect to FIG. 2) detailing compliance risks and recommended actions, presented to compliance officers via the GUI (e.g., GUI 221 with respect to FIG. 2). Upon confirmation, an executable system resource (e.g., executable system resource 230 with respect to FIG. 2) is triggered to hold the payment, request additional documentation, or notify regulatory bodies.

In a non-limiting example, a wealth management platform integrates the system to optimize portfolio rebalancing for high-net-worth clients. Internal data regarding portfolio holdings, client investment preferences, and transaction history are maintained as user data structures (e.g., user data structures 204 with respect to FIG. 2) and logged interactions (e.g., logged interactions 205 with respect to FIG. 2) in the local data repository (e.g., local data repository 220 with respect to FIG. 2). The system continuously ingests validated external data e.g., market performance metrics, analyst ratings, and breaking news affecting specific asset classes, using the fenced ingestion gateway (e.g., fenced ingestion gateway 250 with respect to FIG. 2). When significant market events are detected, the system updates the graph data structure (e.g., computer-generated graph data structure 208 with respect to FIG. 2) to reflect potential impacts on client portfolios. The model (e.g., model 210 with respect to FIG. 2) analyzes the combined data to identify portfolios at risk of exceeding allocation targets or underexposure to certain sectors. An instruction set (e.g., instruction set 211 with respect to FIG. 2) is generated with recommended trades, risk assessments, and supporting rationale, delivered to advisors via the GUI (e.g., GUI 221 with respect to FIG. 2). Advisors may accept recommendations to trigger an executable system resource (e.g., executable system resource 230 with respect to FIG. 2) that submits trade orders, documents the rationale for compliance, and notifies clients of the portfolio changes.

The ASC may log user interactions and system events in a manner that is both secure and respectful of privacy. Logged interactions are limited to information associated with appropriate and suitable permissions from users. All data collection may be governed by access controls and audit policies so that information is accessible to authorized personnel.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed. On the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples or exemplary language (e.g., "e.g.,") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about," "substantially", "similar to", "similar", or "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, e.g., a fabrication tolerance. In the present disclosure, "ranges" refers to a range of values between the two stated extents and/or including one of the two stated extents.

Disjunctive language e.g., the phrase "at least one of X, Y, or Z," unless specifically stated otherwise, is intended to be understood within the context as used in general to present that an item, term, etc., may be either X, Y, or Z, or any combination thereof (i.e., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:

detecting a system-generated event signal based at least in part on a machine-readable data stream that is associated with a user data structure, wherein the machine-readable data stream is generated based at least in part on:

i) first metadata associated with logged interactions of the user data structure, the first metadata being stored on a local data repository, and ii) second metadata associated with an external system event that is stored on a remote data repository, wherein the second metadata is generated independently of the logged interactions or the user data structure;

generating a computer-generated graph data structure by:

generating a first group of graph vertices that represent data entries in the first metadata;

generating a second group of graph vertices that represent data entries in the second metadata; and generating one or more graph data structure linkages that connect one or more first graph vertices of the first group of graph vertices to one or more second graph vertices of the second group of graph vertices based at least in part on data relationships between the first group of graph vertices and the second group of graph vertices;

causing a model to generate an output by querying the computer-generated graph data structure based at least in part on at least one of: the system-generated event signal, the one or more first graph vertices, the one or more second graph vertices, the one or more graph data structure linkages, or the data relationships, wherein the output comprises an enhanced feature set of at least one of the first metadata or the second metadata;

generating an instruction set that is associated with the user data structure based at least in part on the output, wherein the instruction set includes one or more structured data fields that are initialized with the enhanced feature set; and causing an executable system resource associated with the user data structure to be initiated based at least in part on receiving an input associated with the instruction set.

2. The computer-implemented method of claim 1, wherein the machine-readable data stream is further generated based at least in part on:

causing, by a secure environment that includes the local data repository, a fenced ingestion gateway to initiate;

causing the fenced ingestion gateway to retrieve the external system event from the remote data repository;

performing a validation check on unverified data associated with the external system event based at least in part on a security protocol;

causing the fenced ingestion gateway to perform at least one of i) or ii):

i) converting the unverified data into the second metadata based at least in part on the unverified data passing the validation check; and transmitting, in a secure payload, the second metadata to the secure environment; or ii) quarantining the unverified data based at least in part on the unverified data failing the validation check.

3. The computer-implemented method of claim 1, wherein the model is a machine learning model, wherein the computer-implemented method further comprises:

generating a trained machine learning model based at least in part on training the machine learning model by using at least one of: i) the computer-generated graph data structure or ii) the second metadata as unlabeled training data, and the first metadata as labeled data; and deploying the trained machine learning model to be used by a digital assistant.

4. The computer-implemented method of claim 1, further comprising:

causing a digital assistant to access the instruction set; and generating a graphical user interface (GUI) by the digital assistant based at least in part on the instruction set, wherein generating the GUI comprises:

generating and displaying on the GUI, for at least the one or more structured data fields, an interactive object that includes a representation associated with the enhanced feature set, wherein the input is associated with an interaction with the interactive object.

5. The computer-implemented method of claim 1, further comprising:

retrieving an existing computer-generated graph data structure that was generated using at least the first metadata, wherein the first group of graph vertices exist within the existing computer-generated graph data structure, and wherein generating the computer-generated graph data structure further comprises:

adding the second group of graph vertices to the existing computer-generated graph data structure.

6. The computer-implemented method of claim 1, further comprising:

generating an updated computer-generated graph data structure based at least in part on at least one of: the instruction set and feedback data, wherein feedback data represents an instruction to modify the instruction set to modify a first structured data field of the one or more structured data fields.

7. The computer-implemented method of claim 1, wherein initializing the executable system resource further comprises causing at least one of:

isolating a network data instantiation associated with the user data structure;

blocking the network data instantiation associated with the user data structure; and permitting the network data instantiation to occur that is associated with the user data structure.

8. A non-transitory computer readable medium having instructions that when executed by one or more processors, cause the one or more processors to perform operations comprising:

detect a system-generated event signal based at least in part on a machine-readable data stream that is associated with a user data structure, wherein the machine-readable data stream is generated based at least in part on:

i) first metadata associated with logged interactions of the user data structure, the first metadata being stored on a local data repository, and ii) second metadata associated with an external system event that is stored on a remote data repository, wherein the second metadata is generated independently of the logged interactions or the user data structure;

generating a computer-generated graph data structure by:

generate a first group of graph vertices that represent data entries in the first metadata;

generate a second group of graph vertices that represent data entries in the second metadata; and generate one or more graph data structure linkages that connect one or more first graph vertices of the first group of graph vertices to one or more second graph vertices of the second group of graph vertices based at least in part on data relationships between the first group of graph vertices and the second group of graph vertices;

cause a model to generate an output by querying the computer-generated graph data structure based at least in part on at least one of: the system-generated event signal, the one or more first graph vertices, the one or more second graph vertices, the one or more graph data structure linkages, or the data relationships, wherein the output comprises an enhanced feature set of at least one of the first metadata or the second metadata;

generate an instruction set that is associated with the user data structure based at least in part on the output, wherein the instruction set includes one or more structured data fields that are initialized with the enhanced feature set; and cause an executable system resource associated with the user data structure to be initiated based at least in part on receiving an input associated with the instruction set.

9. The non-transitory computer readable medium of claim 8, wherein the machine-readable data stream is further generated based at least in part on:

causing, by a secure environment that includes the local data repository, a fenced ingestion gateway to initiate;
causing the fenced ingestion gateway to retrieve the external system event from the remote data repository;
performing a validation check on unverified data associated with the external system event based at least in part on a security protocol;
causing the fenced ingestion gateway to perform at least one of i) or ii):
i) converting the unverified data into the second metadata based at least in part on the unverified data passing the validation check; and
transmitting, in a secure payload, the second metadata to the secure environment; or
ii) quarantining the unverified data based at least in part on the unverified data failing the validation check.

10. The non-transitory computer readable medium of claim 8, wherein the model is a machine learning model, wherein the operations further comprise:
generate a trained machine learning model based at least in part on training the machine learning model by using at least one of: i) the computer-generated graph data structure or ii) the second metadata as unlabeled training data, and the first metadata as labeled data; and
deploy the trained machine learning model to be used by a digital assistant.

11. The non-transitory computer readable medium of claim 8, wherein the operations further comprise:
cause a digital assistant to access the instruction set; and
generate a graphical user interface (GUI) by the digital assistant based at least in part on the instruction set, wherein generating the GUI comprises:
generate and display on the GUI, for at least the one or more structured data fields, an interactive object that includes a representation associated with the enhanced feature set, wherein the input is associated with an interaction with the interactive object.

12. The non-transitory computer readable medium of claim 8, wherein the operations further comprise:
retrieve an existing computer-generated graph data structure that was generated using at least the first metadata, wherein the first group of graph vertices exist within the existing computer-generated graph data structure, and wherein generating the computer-generated graph data structure further comprises:
add the second group of graph vertices to the existing computer-generated graph data structure.

13. The non-transitory computer readable medium of claim 8, wherein the operations further comprise:
generate an updated computer-generated graph data structure based at least in part on at least one of: the instruction set and feedback data, wherein feedback data represents an instruction to modify the instruction set to modify a first structured data field of the one or more structured data fields.

14. The non-transitory computer readable medium of claim 8, wherein initializing the executable system resource further comprises causing at least one of:
isolating a network data instantiation associated with the user data structure;
blocking the network data instantiation associated with the user data structure; and
permitting the network data instantiation to occur that is associated with the user data structure.

15. A system comprising:
one or more processors; and
one or more memories having instructions that when executed by the one or more processors, cause the one or more processors to perform operations comprising:
detect a system-generated event signal based at least in part on a machine-readable data stream that is associated with a user data structure, wherein the machine-readable data stream is generated based at least in part on:
i) first metadata associated with logged interactions of the user data structure, the first metadata being stored on a local data repository, and
ii) second metadata associated with an external system event that is stored on a remote data repository, wherein the second metadata is generated independently of the logged interactions or the user data structure;
generating a computer-generated graph data structure by:
generate a first group of graph vertices that represent data entries in the first metadata;
generate a second group of graph vertices that represent data entries in the second metadata; and
generate one or more graph data structure linkages that connect one or more first graph vertices of the first group of graph vertices to one or more second graph vertices of the second group of graph vertices based at least in part on data relationships between the first group of graph vertices and the second group of graph vertices;
cause a model to generate an output by querying the computer-generated graph data structure based at least in part on at least one of: the system-generated event signal, the one or more first graph vertices, the one or more second graph vertices, the one or more graph data structure linkages, or the data relationships, wherein the output comprises an enhanced feature set of at least one of the first metadata or the second metadata;
generate an instruction set that is associated with the user data structure based at least in part on the output, wherein the instruction set includes one or more structured data fields that are initialized with the enhanced feature set; and
cause an executable system resource associated with the user data structure to be initiated based at least in part on receiving an input associated with the instruction set.

16. The system of claim 15, wherein the machine-readable data stream is further generated based at least in part on:
causing, by a secure environment that includes the local data repository, a fenced ingestion gateway to initiate;
causing the fenced ingestion gateway to retrieve the external system event from the remote data repository;
performing a validation check on unverified data associated with the external system event based at least in part on a security protocol;
causing the fenced ingestion gateway to perform at least one of i) or ii):
i) converting the unverified data into the second metadata based at least in part on the unverified data passing the validation check; and
transmitting, in a secure payload, the second metadata to the secure environment; or
ii) quarantining the unverified data based at least in part on the unverified data failing the validation check.

17. The system of claim 15, wherein the model is a machine learning model, wherein the operations further comprise:

generate a trained machine learning model based at least in part on training the machine learning model by using at least one of: i) the computer-generated graph data structure or ii) the second metadata as unlabeled training data, and the first metadata as labeled data; and deploy the trained machine learning model to be used by a digital assistant.

18. The system of claim 15, wherein the operations further comprise:

cause a digital assistant to access the instruction set; and generate a graphical user interface (GUI) by the digital assistant based at least in part on the instruction set, wherein generating the GUI comprises:

generate and display on the GUI, for at least the one or more structured data fields, an interactive object that includes a representation associated with the enhanced feature set, wherein the input is associated with an interaction with the interactive object.

19. The system of claim 15, wherein the operations further comprise:

retrieve an existing computer-generated graph data structure that was generated using at least the first metadata, wherein the first group of graph vertices exist within the existing computer-generated graph data structure, and wherein generating the computer-generated graph data structure further comprises:

add the second group of graph vertices to the existing computer-generated graph data structure.

20. The system of claim 15, wherein initializing the executable system resource further comprises causing at least one of:

isolating a network data instantiation associated with the user data structure;

blocking the network data instantiation associated with the user data structure; and permitting the network data instantiation to occur that is associated with the user data structure.

* * * * *